(12) United States Patent
Yasui

(10) Patent No.: US 8,792,168 B2
(45) Date of Patent: Jul. 29, 2014

(54) OPTICAL SYSTEM INCLUDING DIFFRACTIVE GRATING AND OPTICAL APPARATUS

(75) Inventor: Hiroto Yasui, Saitama (JP)

(73) Assignee: Canon Kabushiki Kaisha (JP)

( * ) Notice: Subject to any disclaimer, the term of this patent is extended or adjusted under 35 U.S.C. 154(b) by 293 days.

(21) Appl. No.: 13/236,766

(22) Filed: Sep. 20, 2011

(65) Prior Publication Data

US 2012/0081790 A1 Apr. 5, 2012

(30) Foreign Application Priority Data

Sep. 30, 2010 (JP) ................................. 2010-220815

(51) Int. Cl.
*G02B 5/18* (2006.01)
*G02B 27/42* (2006.01)

(52) U.S. Cl.
CPC ................ *G02B 5/18* (2013.01); *G02B 5/1814* (2013.01); *G02B 27/4205* (2013.01)
USPC ............................ 359/565; 359/576; 359/569

(58) Field of Classification Search
USPC .................. 359/565, 569, 574, 743, 676, 576
See application file for complete search history.

(56) References Cited

U.S. PATENT DOCUMENTS

| | | | |
|---|---|---|---|
| 6,628,462 B2 * | 9/2003 | Ogawa | 359/743 |
| 6,873,463 B2 * | 3/2005 | Nakai | 359/574 |
| 7,545,577 B2 * | 6/2009 | Hamano et al. | 359/676 |
| 7,990,615 B2 * | 8/2011 | Suzuki | 359/569 |

FOREIGN PATENT DOCUMENTS

| | | |
|---|---|---|
| JP | 11-271514 A | 10/1999 |
| JP | 2000-098118 A | 4/2000 |
| JP | 2003215456 A | 7/2003 |
| JP | 2003-227913 A | 8/2003 |
| JP | 2003-262713 A | 9/2003 |
| JP | 2006-003913 A | 1/2006 |
| JP | 2008-209866 A | 9/2008 |
| JP | 2010-128303 A | 6/2010 |

* cited by examiner

*Primary Examiner* — Audrey Y Chang
(74) *Attorney, Agent, or Firm* — Rossi, Kimms & McDowell LLP

(57) ABSTRACT

The optical system includes plural lens groups, a negative lens included in one lens group among the plural lens groups and formed of a first medium, a diffractive grating formed on at least one lens surface of the negative lens and being in contact with a second medium different from the first medium, and a positive lens included in the one lens group and formed of a third medium different from the first medium and the second medium. The first medium satisfies ndA≥1.7 and 40≤vdA≤55 where ndA represents a refractive index of the first medium for a d-line, and vdA represents an Abbe number of the first medium for the d-line. The third medium satisfies ndC≤1.55 and vdC≥60 where ndC represents a refractive index of the third medium for the d-line, and vdC represents an Abbe number of the third medium for the d-line.

20 Claims, 14 Drawing Sheets

OPTICAL SYSTEM INCLUDING DIFFRACTIVE GRATING AND OPTICAL APPARATUS

BACKGROUND OF THE INVENTION

1. Field of the Invention

The present invention relates to an optical system including a diffractive optical element (diffractive grating), and particularly relates to an optical system suitable for optical apparatuses such as image pickup apparatuses.

2. Description of the Related Art

As a method for reducing chromatic aberration generated in optical systems, such as chromatic aberration of magnification and longitudinal chromatic aberration, Japanese Patent Laid-Open Nos. 2006-003913 and 11-271514 disclose an achromatizing method using a diffractive optical element (DOE). Optical systems disclosed in Japanese Patent Laid-Open Nos. 2006-003913 and 11-271514 achieve achromatization by using (a) an aspheric surface effect obtained by varying a periodic structure of the DOE and (b) a chromatic aberration reduction effect obtained by utilizing a negative dispersion characteristic (vd=−3.453) and a strong anomalous dispersion characteristic (θgF=0.296) of the DOE, which are different from those of general glass materials. Such an achromatizing method enables not only the reduction of the chromatic aberration but also miniaturization of the optical system.

Japanese Patent Laid-Open No. 2006-003913 discloses a DOE formed by bringing resin materials in contact with each other or stacking them with each other. Moreover, Japanese Patent Laid-Open No. 11-271514 discloses a DOE formed by bringing a glass material and a resin material in contact with each other.

Furthermore, Japanese Patent Laid-Open Nos. 2000-098118 and 2003-227913 disclose DOEs formed by using a glass material and a resin material. The DOE disclosed in Japanese Patent Laid-Open No. 2000-098118 is a two contacted layer DOE in which two diffractive gratings are disposed in contact with each other, and the DOE disclosed in Japanese Patent Laid-Open No. 2003-227913 is a stacked DOE in which plural diffractive gratings are stacked. These DOE appropriately select material forming the respective diffractive gratings and grating thicknesses of the respective diffractive gratings to achieve a high diffraction efficiency in a wide wavelength range for a specific order diffracted light. The diffraction efficiency is a ratio of a light intensity of the specific order diffracted light to that of entire light that is transmitted through the DOE.

The optical systems disclosed in Japanese Patent Laid-Open Nos. 2006-003913, 11-271514, 2000-098118 and 2003-227913, each of which includes the diffractive optical element, can have a sufficient chromatic aberration reduction effect. However, the grating thickness of the diffractive optical element in each of these optical systems is large, which may cause decrease of the diffraction efficiency when light obliquely enters to the diffractive optical element. The decrease of the diffraction efficiency increases unnecessary order diffracted light, which causes deterioration of imaging performance of the optical system due to flare or ghost and decrease of contrast of an image formed by the optical system.

SUMMARY OF THE INVENTION

The present invention provides a compact optical system capable of providing a sufficient chromatic aberration reduction effect while suppressing generation of unnecessary order diffracted light in a diffractive optical element.

The present invention provides as an aspect thereof an optical system including plural lens groups, a negative lens included in one lens group among the plural lens groups and formed of a first medium, a diffractive grating formed on at least one lens surface of the negative lens and being in contact with a second medium different from the first medium, and a positive lens included in the one lens group and formed of a third medium different from the first medium and the second medium. The first medium satisfies the following conditions:

$$ndA \geq 1.7$$

$$40 \leq vdA \leq 55$$

where ndA represents a refractive index of the first medium for a d-line, and vdA represents an Abbe number of the first medium for the d-line, and the third medium satisfies the following conditions:

$$ndC \leq 1.55$$

$$vdC \geq 60$$

where ndC represents a refractive index of the third medium for the d-line, and vdC represents an Abbe number of the third medium for the d-line.

The present invention provides as another aspect thereof an optical apparatus including the above-described optical system.

Further features of the present invention will become apparent from the following description of exemplary embodiments with reference to the attached drawings.

DESCRIPTION OF THE PREFERRED EMBODIMENTS

Figure 1:
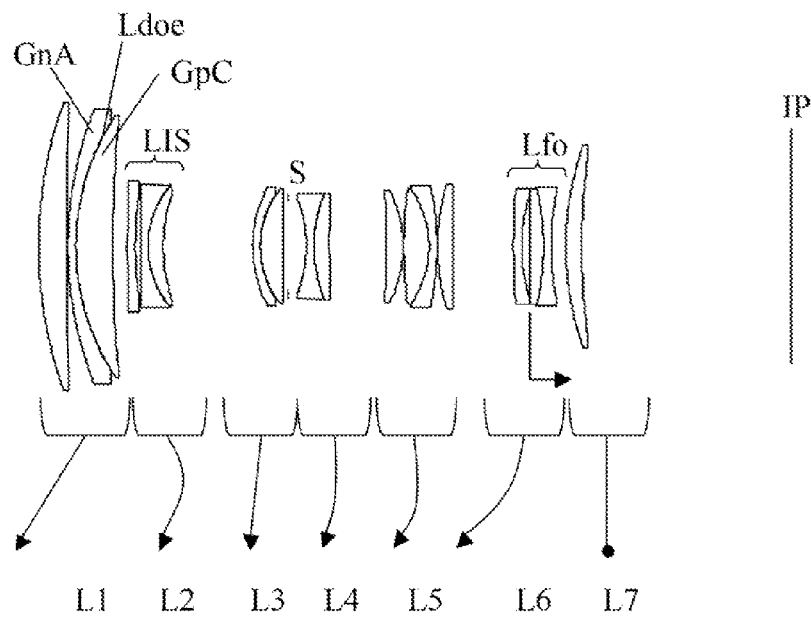
FIG. 1 is a cross-sectional view showing the configuration of an optical system that is Embodiment 1 (Numerical Example 1) of the present invention, the optical system being in a wide-angle end zoom state in an infinitely far object distance focus state.

Exemplary embodiments of the present invention will hereinafter be described with reference to the accompanying drawings.

Before description of specific embodiments (numerical examples) of the present invention, common matters to the embodiments will be described.

An optical system of each embodiment includes plural lens groups, and one same lens group (hereinafter referred to as a "specific lens group") among the plural lens groups includes both the following negative lens and positive lens. The negative lens is formed of a low-melting-point glass (hereinafter referred to as a "material A") that is a first medium. The positive lens is formed of a low refractive index and low dispersion glass (hereinafter referred to as a "material C") that is a third medium.

In the specific lens group, the negative lens and the positive lens are disposed at a position as close to an object or an image (image surface) as possible, and disposed close to each other. This configuration enables sufficient correction (reduction) of various aberrations such as chromatic aberration of the entire optical system.

In addition, on at least one lens surface of the negative lens formed of the material A, a diffraction grating is formed of the same material A. Furthermore, an ultraviolet curable resin or a fine particle dispersed material, which is a second medium (hereinafter referred to as a "material B"), is brought into contact with this lens surface (hereinafter referred to as a "diffractive surface") on which the diffraction grating is formed. This configuration enables reduction of a grating thickness of the diffraction grating formed on the diffractive surface, and enables provision of a high diffraction efficiency in a visible wavelength range. Moreover, the reduction of the grating thickness of the diffraction grating makes it possible to suppress deterioration of diffraction efficiency for obliquely entering light, which enables suppression of generation of unnecessary diffracted light (flare or ghost) at the diffractive surface.

Description will hereinafter be made of conditions that the materials A and C should satisfy. The material A should satisfy the following conditions (1) and (2), and the material C should satisfy the following conditions (3) and (4):

$$ndA \geq 1.7 \quad (1)$$

$$40 \leq vdA \leq 55 \quad (2)$$

$$ndC \leq 1.55 \quad (3)$$

$$vdC \geq 60 \quad (4)$$

where ndA represents a refractive index of the material A for a d-line, vdA represents an Abbe number (Abbe constant) of the material A for the d-line, ndC represents a refractive index of the material C for the d-line and vdC represents an Abbe number of the material C for the d-line.

Figure 9:
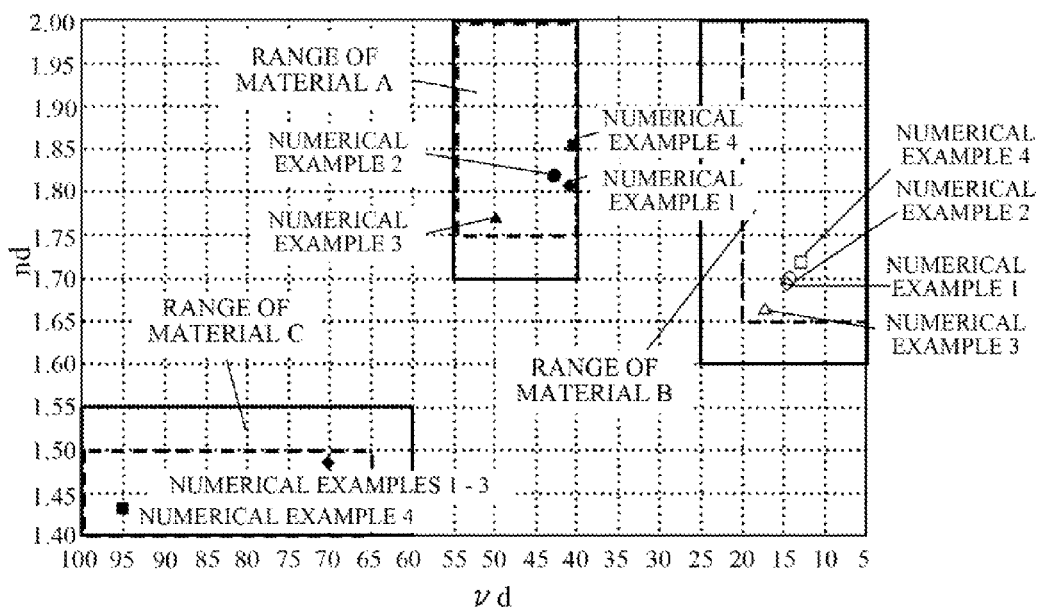
FIG. 9 shows a relationship between nd and vd of a material used in each of Numerical Examples 1-4.

FIG. 9 shows a range of the material A satisfying the conditions (1) and (2) and a range of the material C satisfying the conditions (3) and (4), the ranges being surrounded by rectangular lines. In FIG. 9, a vertical axis shows the refractive index for the d-line, and a horizontal axis shows the Abbe number for the d-line.

As to the material A, a value of ndA lower than the lower limit of the condition (1) makes it impossible not only to sufficiently correct the various aberrations, especially the chromatic aberration, but also to reduce a range of choices of the low-melting-point glass, which is undesirable.

Moreover, a value of vdA lower than the lower limit of the condition (2) causes an existing range of the material B that is brought into contact with the diffractive grating formed of the material A to disappear, which is undesirable. On the other hand, a value of vdA higher than the upper limit of the condition (2) makes it difficult to sufficiently correct the various aberrations, especially the chromatic aberration, which is undesirable.

As to the material C, a value of ndC lower than the lower limit of the condition (3) causes glass materials that can sufficiently correct the various aberrations of the optical system to disappear, which is undesirable.

Moreover, a higher value of vdC than the upper limit of the condition (4) makes it impossible to sufficiently correct the various aberrations, especially the chromatic aberration, which is undesirable.

Figure 15:
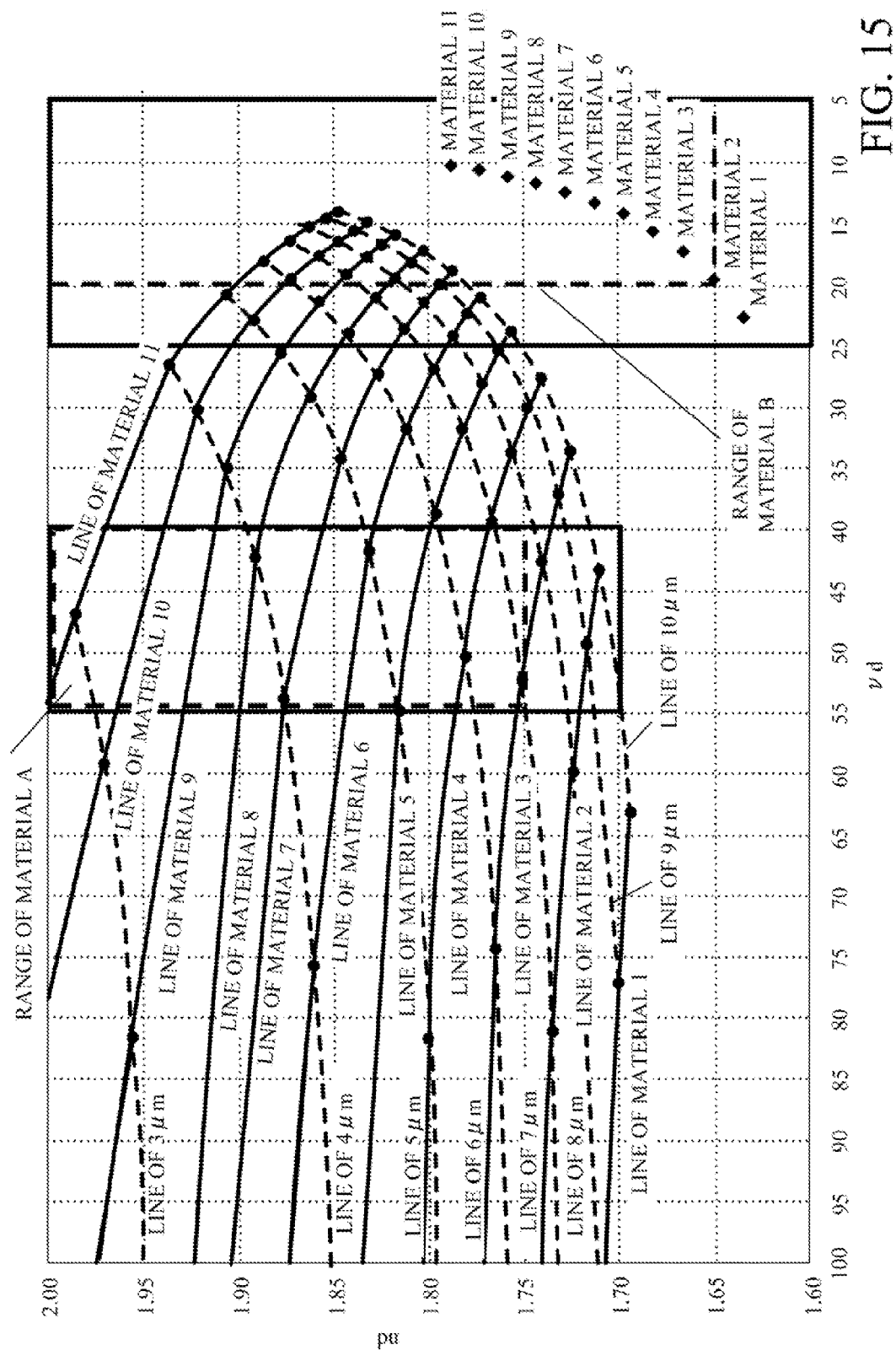
FIG. 15 shows a relationship between nd and vd of a material used in each of Numerical Examples 1-4.

Next, description will be made of reasons that the materials A and C should satisfy the above-described conditions (1) to (4), with reference to FIG. 15. In FIG. 15, a vertical axis shows the refractive index for the d-line, and a horizontal axis shows the Abbe number for the d-line. Moreover, FIG. 15 shows examples of the material A as materials 1 to 11, each providing a diffraction efficiency of 100% when the same material B is brought into contact with the diffractive grating formed of each example of the material A to form a single diffractive optical element (DOE) as a two contacted layer DOE and light enters perpendicularly thereto.

For example as to the material 1, a "line of material 1" in FIG. 15 shows a range of the material 1 that provides the diffraction efficiency of 100% for the perpendicularly entering light. In FIG. 15, grating thicknesses of the two contacted layer DOE when the materials 1 to 11 are selected are shown by dotted lines.

As clearly understood from FIG. 15, a material having a higher refractive index and a lower dispersion can provide the diffraction efficiency of 100% with a smaller grating thickness. In FIG. 15, the material 11 having the highest refractive index and the lowest dispersion provides the diffraction efficiency of 100% with the smallest grating thickness.

On the other hand, although it is necessary for the chromatic aberration correction in the optical system to use a low dispersion glass as a material of a positive lens and to use a high dispersion glass as a material of a negative lens, it is desirable to use, from a viewpoint of the diffraction efficiency, a low dispersion glass such as the material A as a material of the diffractive grating formed on the negative lens.

Thus, each embodiment sets the conditions (1) and (2) that the material A should satisfy in order to appropriately meet both the above-described conflicting demands. In addition, each embodiment limits the material C of the positive lens to a material having a lower refractive index and a lower dispersion, which satisfies the conditions (3) and (4), in order to enable, even when using such a material A, sufficient correction of the chromatic aberration of the entire optical system.

Satisfying the conditions (1) to (4) is also effective for miniaturization of the entire optical system.

Moreover, modifying the conditions (1), (3) and (4) to the following conditions (1a), (3a) and (4a) makes it possible to increase the effect of correcting the various aberrations of the optical system, especially the chromatic aberration. Furthermore, the modification also enables further miniaturization of the optical system.

$$ndA \geq 1.75 \tag{1a}$$

$$ndC \leq 1.50 \tag{3a}$$

$$vdC \geq 65 \tag{4a}$$

Satisfying not only the conditions (1) to (4) but also at least one of the following conditions (5) to (8) and (I) is more preferable to realize a compact optical system in which generation of the unnecessary diffracted light (flare or ghost) at the diffractive surface is suppressed and sufficient correction of the chromatic aberration is made.

First, it is desirable to satisfy the following condition (5):

$$0.00 \leq |LGAC/\sqrt{(OLW \times OLT)}| < 0.10 \tag{5}$$

where LGAC represents a distance on an optical axis between the diffractive surface (diffractive grating) formed on the negative lens in the specific lens group and a negative lens side surface of the positive lens which is a lens surface facing toward the negative lens, OLW represents an entire optical length of the optical system when a focal length of the optical system is at a wide-angle end and an object distance is an infinitely far distance, and OLT represents an entire optical length of the optical system when the focal length of the optical system is at a telephoto end and the object distance is the infinitely far distance, OLT being equal to OLW when the optical system has a single focal length.

The condition (5) limits the distance on the optical axis between the negative lens formed of the material A and the positive lens formed of the material C in the specific lens group. A value of $|LGAC/\sqrt{(OLW \times OLT)}|$ higher than the upper limit of the condition (5) results from an exceedingly long distance between the negative lens and the positive lens, which undesirably makes it difficult to correct the various aberrations of the optical system, especially the chromatic aberration.

Modifying the condition (5) to the following condition (5a) makes it possible to more sufficiently correct the chromatic aberration:

$$0.00 \leq |LGAC/\sqrt{(OLW \times OLT)}| < 0.07 \tag{5a}$$

Moreover, when the optical system includes a first lens that is a lens disposed closest to the object (most-object side lens), a second lens that is a lens disposed closest to the image (most-image side lens) and an aperture stop, it is more desirable to satisfy the following condition (6):

$$0.001 < |LOID/\sqrt{(OLW \times OLT)}| < 0.50 \tag{6}$$

where LOID represents the following distance:

(a) when the diffractive surface (diffractive grating) is disposed closer to the object than the aperture stop and the object distance is the infinitely far distance, a distance from an object side lens surface of the first lens to the diffractive surface; or (b) when the diffractive surface is disposed closer to the image than the aperture stop and the object distance is the infinitely far distance, a distance from an image side lens surface of the second lens to the diffractive surface.

The condition (6) limits a range where the diffractive surface can be disposed. A value of $|LOID/\sqrt{(OLW \times OLT)}|$ lower than the lower limit of the condition (6) results from a configuration in which the diffractive surface is provided on the object side lens surface of the first lens (most-object side lens) or on the image side lens surface of the second lens (most-image side lens), which is undesirable from a viewpoint of dust-proofness.

On the other hand, a value of $|LOID/\sqrt{(OLW \times OLT)}|$ higher than the upper limit of the condition (6) results from a configuration in which the diffractive surface is provided at a position exceedingly away from the object side lens surface of the first lens or from the image side lens surface of the second lens, which undesirably makes it impossible to obtain a sufficient chromatic aberration correction effect.

Modifying the condition (6) to the following condition (6a) makes it possible to facilitate production of the diffractive grating and to more sufficiently correct the chromatic aberration:

$$0.005 < |LOID/\sqrt{(OLW \times OLT)}| < 0.30 \tag{6a}$$

It is more desirable to satisfy the following condition (7):

$$0.001 < |\sqrt{(fw \times ft)}/fdoe| < 0.10 \tag{7}$$

where fdoe represents a diffractive focal length of the diffractive surface, fw represents a focal length of the optical system at the wide-angle end when the object distance is the infinity far distance, and ft represents a focal length of the optical system at the telephoto end when the object distance is the infinity far distance, ft being equal to fw when the optical system has a single focal length.

The condition (7) limits a relationship between the diffractive focal length (that is, a focal length obtained by diffraction) of the diffractive surface and the focal length of the entire optical system. A value of $|\sqrt{(fw \times ft)}/fdoe|$ lower than the lower limit of the condition (7) excessively reduces a refractive power (that is, an optical power) of the diffraction with respect to the focal length of the entire optical system, which undesirably makes it difficult to sufficiently correct the chromatic aberration of the optical system.

On the other hand, a value of $|\sqrt{(fw \times ft)}/fdoe|$ higher than the upper limit of the condition (7) excessively increases the refractive power of the diffraction with respect to the focal length of the entire optical system and reduces a grating pitch of the diffractive grating, which undesirably causes deterioration of the diffraction efficiency and generation of the unnecessary diffracted light associated therewith.

Modifying the condition (7) to the following condition (7a) makes it possible to increase the chromatic aberration correction effect in the optical system and to avoid the deterioration of the diffraction efficiency:

$$0.01 < |\sqrt{(fw \times ft)}/fdoe| < 0.05 \tag{7a}$$

Moreover, it is still more desirable to satisfy the following condition (8) when the material A is a low-melting-point glass whose glass transition temperature is represented by TgA:

$$TgA \leq 650^\circ C. \tag{8}$$

The condition (8) limits a range of the glass transition temperature of the material A that is a low-melting-point glass. A value of TgA higher than the upper limit of the condition (8) makes the glass transition temperature excessively high, which undesirably makes it difficult to form the diffractive grating on a surface of a glass lens.

Modifying the condition (8) to the following condition (8a) makes it possible to facilitate formation of the diffractive grating, which is more desirable:

$$TgA \leq 620°\ C. \quad (8a)$$

It is further more desirable to satisfy a condition (I) that the diffractive grating formed of the material A and an element formed of the material B satisfying the following conditions (9) to (12) are brought into contact and joined (cemented) with each other to form a single diffractive optical element:

$$ndA-ndB>0 \quad (9)$$

$$ndB \geq 1.60 \quad (10)$$

$$vdB \leq 25 \quad (11)$$

$$hd \leq 8\ \mu m \quad (12)$$

where ndB represents a refractive index of the material B for the d-line, vdB represents an Abbe number of the material B for the d-line, and hd represents a grating thickness of the entire diffractive optical element.

The conditions (9) to (11) limit characteristics of the material B that is a resin material or a fine particle dispersed material and is brought into contact and joined with the diffractive surface formed of the material A to form part of the single diffractive optical element. FIG. 9 shows a range of the material B satisfying the conditions (9) to (11), the range being surrounded by a rectangular solid line.

A value of ndA−ndB lower than the lower limit of the condition (9) makes it impossible to obtain performance that is demanded to the diffractive optical element formed of the materials A and B, which is undesirable. A value of ndB lower than the lower limit of the condition (10) causes the material A, which is used for the negative lens to correct the various aberrations of the optical system, especially the chromatic aberration, not to exist, which is undesirable. A value of vdB higher than the upper limit of the condition (11) makes it impossible to obtain desired performance of the diffractive optical element, which is undesirable.

The condition (12) limits a range of the grating thickness of the diffractive optical element formed of the materials A and B. A value of hd higher than the upper limit of the condition (12) excessively increases the grating thickness, which undesirably significantly deteriorates the diffraction efficiency for the obliquely entering light.

Modifying the conditions (9) to (12) to the following conditions (9a) to (12a) so as to narrow the range of the material B shown in FIG. 9 to a range surrounded by a rectangular dotted line makes it possible to more effectively suppress the deterioration of the diffraction efficiency, which desirably enables a further decrease of the unnecessary diffracted light.

$$ndA-ndB>0.10 \quad (9a)$$

$$ndB \geq 1.65 \quad (10a)$$

$$vdB \leq 20 \quad (11a)$$

$$hd \leq 6\ \mu m \quad (12a).$$

Figure 2A:
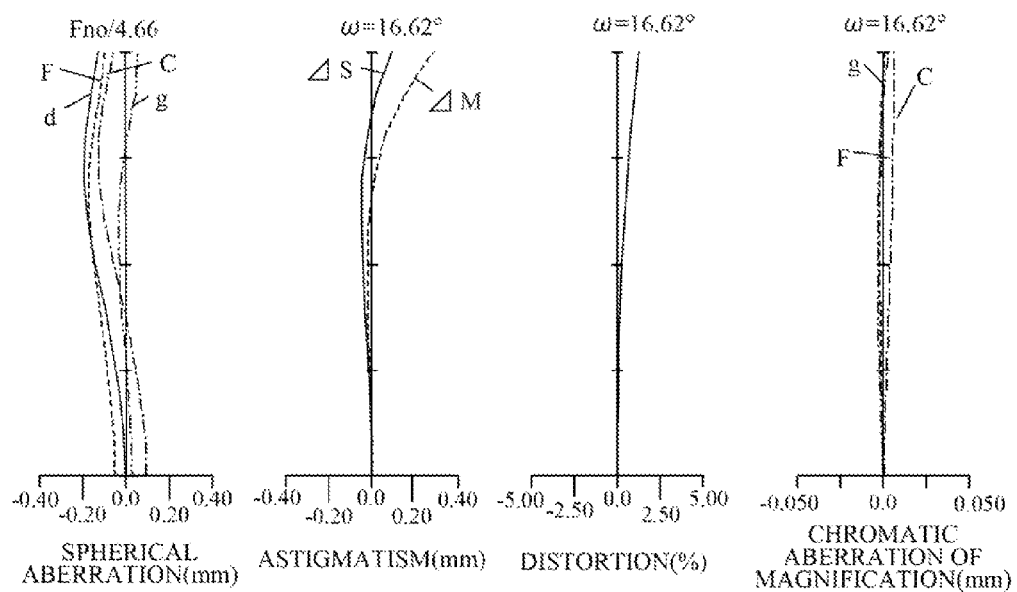
FIGS. 2A to 2C show aberration charts of Numerical Example 1 in the wide-angle end zoom state, a middle zoom state and a telephoto end zoom state in an infinitely far object distance focus state.
Figure 2B:
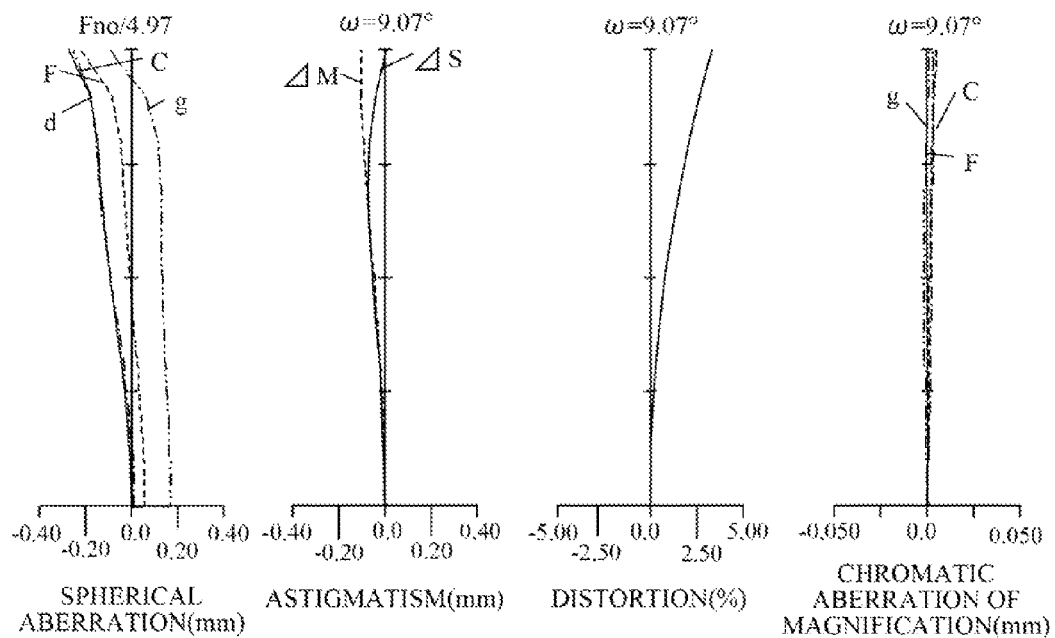
Figure 2C:
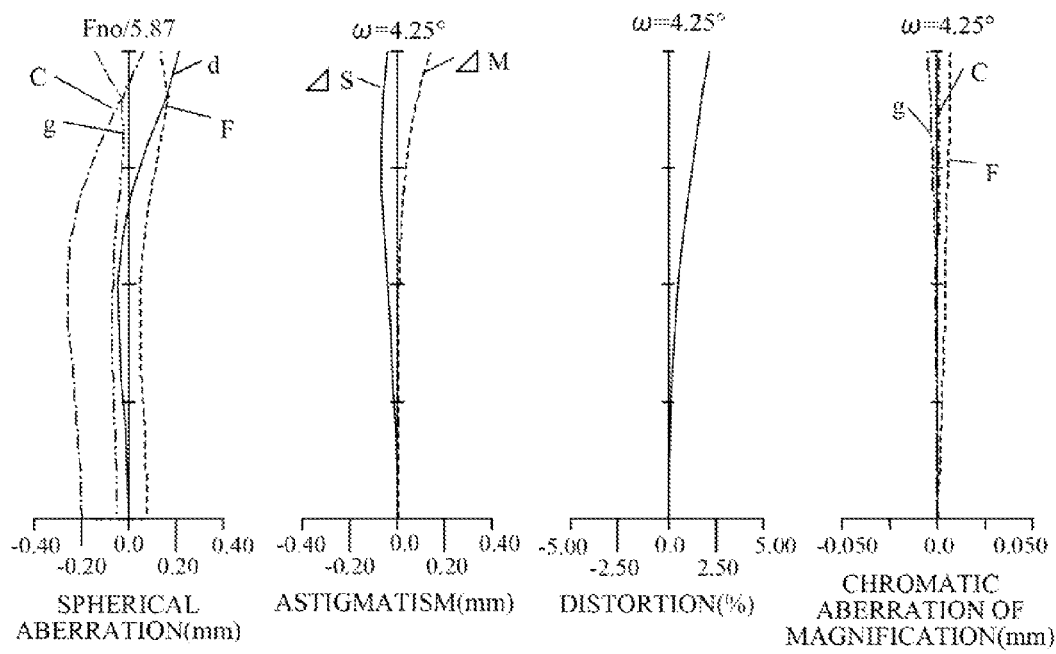

Next, specific embodiments of the present invention will be shown with numerical examples. FIG. 1 shows the configuration of an optical system of Embodiment 1 (Numerical Example 1) when its focal length is at a wide-angle end and its object distance is an infinitely far distance. FIG. 2A shows aberration charts when the focal length is at the wide-angle end and the object distance is the infinitely far distance, FIG. 2B shows aberration charts when the focal length is at a middle zoom position and the object distance is the infinitely far distance, and FIG. 2C shows aberration charts when the focal length is at a telephoto end and the object distance is the infinitely far distance.

Figure 3:
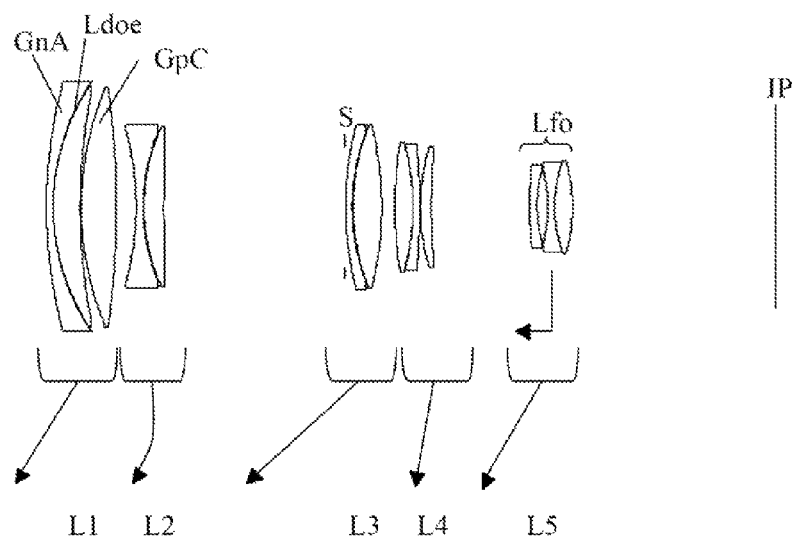
FIG. 3 is a cross-sectional view showing the configuration of an optical system that is Embodiment 2 (Numerical Example 2) of the present invention, the optical system being in a wide-angle end zoom state in an infinitely far object distance focus state.
Figure 4A:
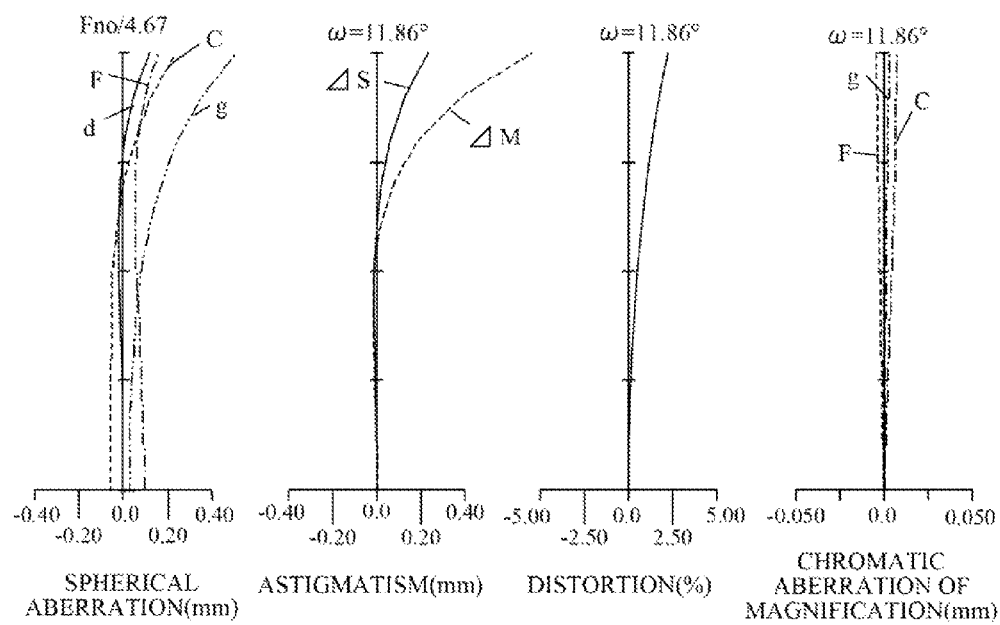
FIGS. 4A to 4C shows aberration charts of Numerical Example 2 in the wide-angle end zoom state, a middle zoom state and a telephoto end zoom state in an infinitely far object distance focus state.
Figure 4B:
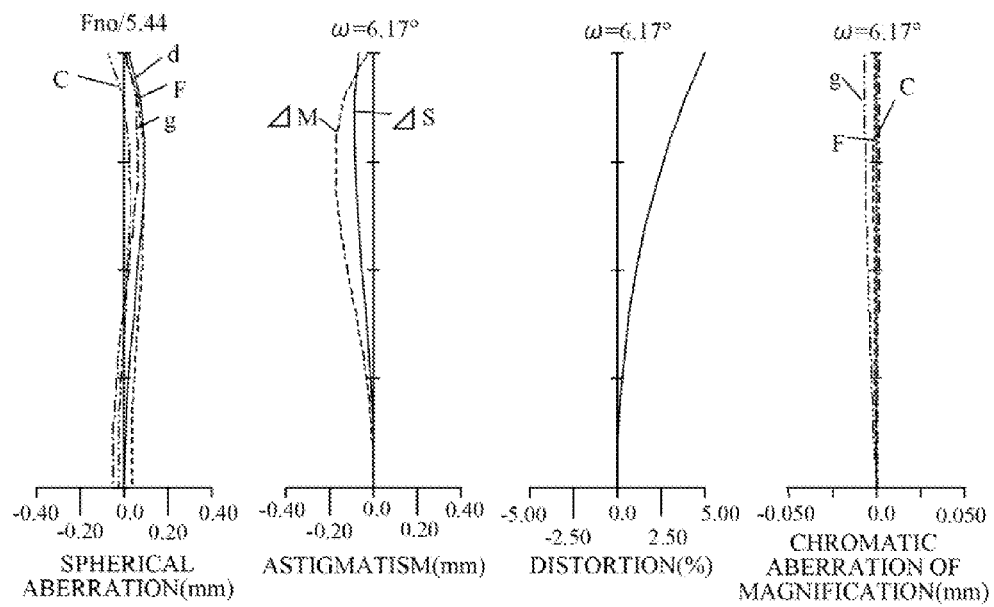
Figure 4C:
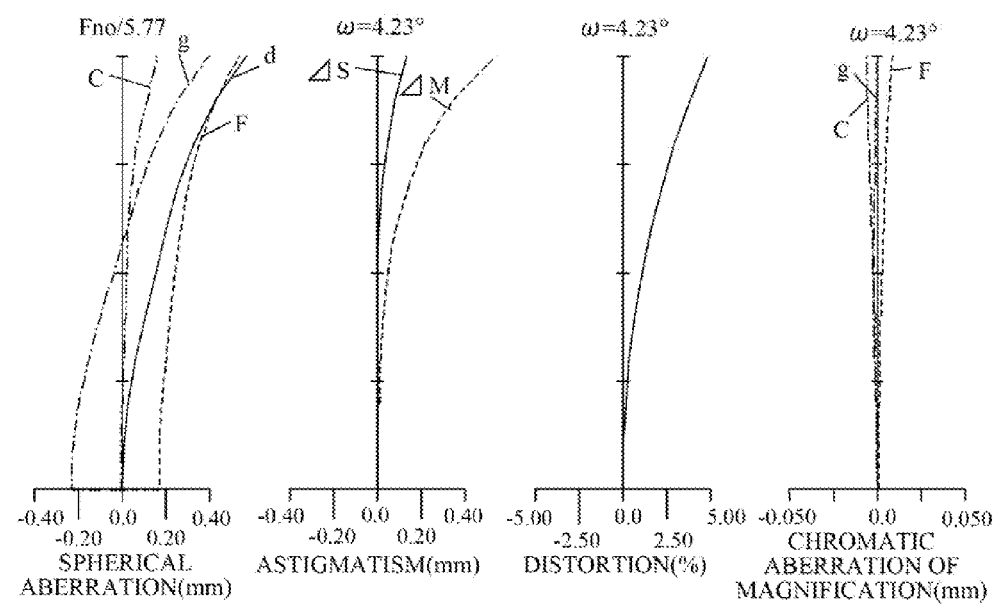

FIG. 3 shows the configuration of an optical system of Embodiment 2 (Numerical Example 2) when its focal length is at a wide-angle end and its object distance is an infinitely far distance. FIG. 4A shows aberration charts when the focal length is at the wide-angle end and the object distance is the infinitely far distance, FIG. 4B shows aberration charts when the focal length is at a middle zoom position and the object distance is the infinitely far distance, and FIG. 4C shows aberration charts when the focal length is at a telephoto end and the object distance is the infinitely far distance.

Figure 5:
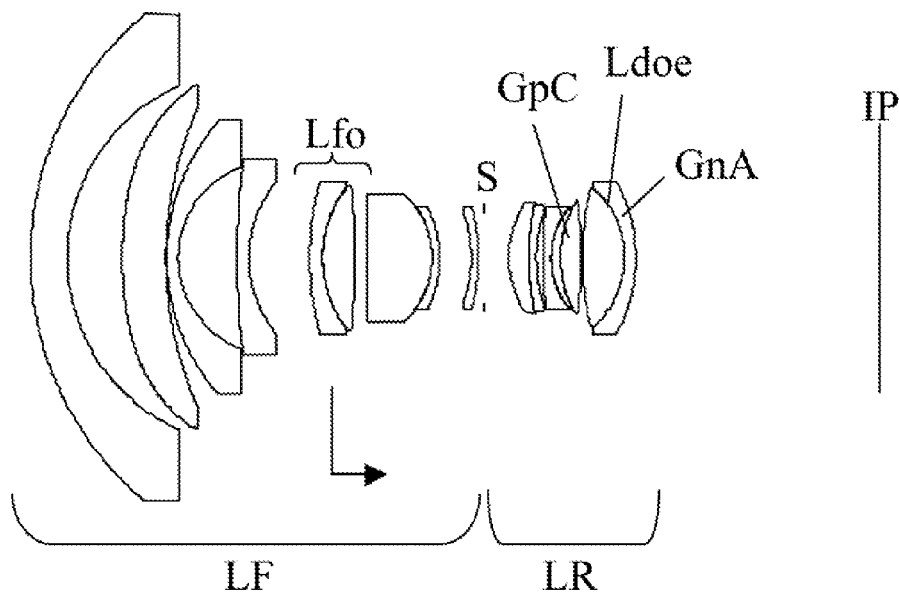
FIG. 5 is a cross-sectional view showing the configuration of an optical system that is Embodiment 3 (Numerical Example 3) of the present invention, the optical system being in an infinitely far object distance focus state.
Figure 6:
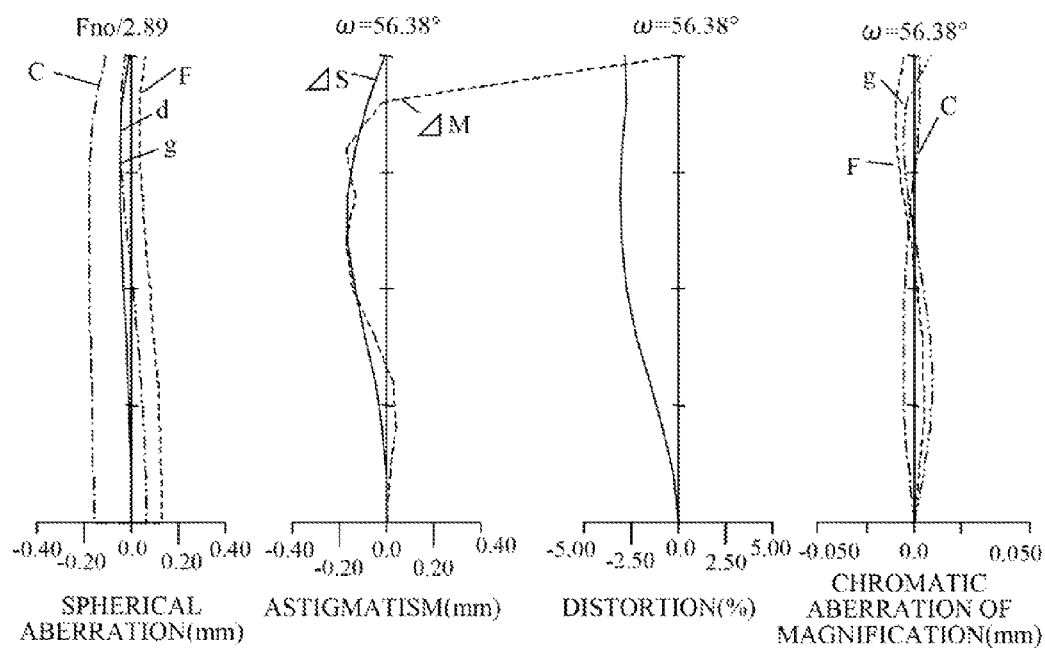
FIG. 6 shows an aberration chart of Numerical Example 3 in an infinitely far object distance focus state.

FIG. 5 shows the configuration of an optical system of Embodiment 3 (Numerical Example 3) when its object distance is an infinitely far distance. FIG. 6 shows aberration charts when the object distance is the infinitely far distance.

Figure 7:
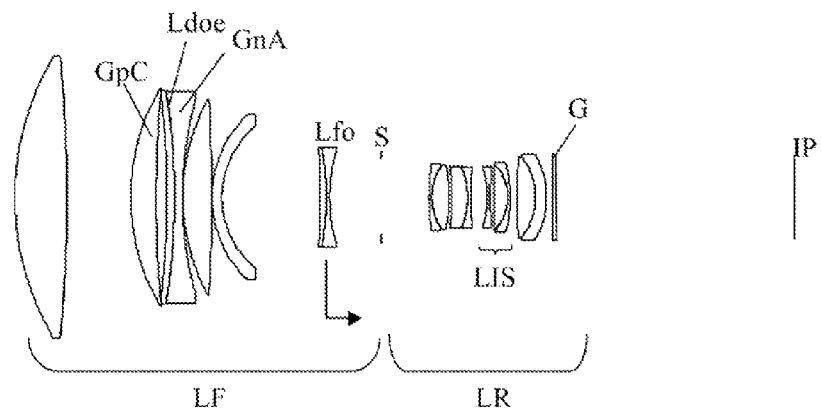
FIG. 7 is a cross-sectional view showing the configuration of an optical system that is Embodiment 4 (Numerical Example 4) of the present invention, the optical system being in an infinitely far object distance focus state.
Figure 8:
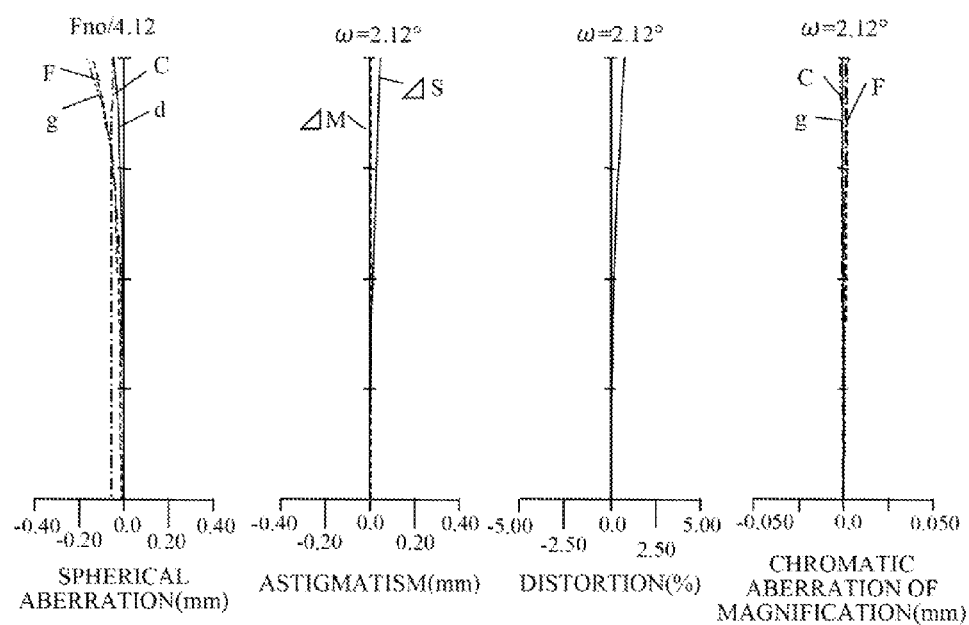
FIG. 8 shows an aberration chart of Numerical Example 4 in an infinitely far object distance focus state.

FIG. 7 shows the configuration of an optical system of Embodiment 4 (Numerical Example 4) when its object distance is an infinitely far distance. FIG. 8 shows aberration charts when the object distance is the infinitely far distance.

In each figure showing the configuration of the optical system, reference character IP denotes an image surface, reference character G denotes a glass block such as a crystal low-pass filter or an infrared cutting filter, reference character S denotes an aperture stop. In each aberration chart of spherical aberration, distortion and chromatic aberration of magnification, a solid line shows the aberration for the d-line, a chain double-dashed line shows the aberration for a g-line, a dashed line shows the aberration for a C-line, and a dotted line shows the aberration for an F-line. Moreover, in the aberration chart of astigmatism, a solid line shows the astigmatism of a sagittal ray (ΔS), and a dotted line shows the astigmatism of a meridional ray (ΔM).

[Embodiment 1]

The optical system of Embodiment 1 shown in FIG. 1 constitutes a telephoto zoom lens to be used for an image pickup apparatus (optical apparatus) such as a digital still camera or a video camera.

The zoom lens includes, in order from the object side, a first lens group L1 having a positive refractive power, a second lens group L2 having a negative refractive power, a third lens group L3 having a positive refractive power, a fourth lens group L4 having a negative refractive power, a fifth lens group L5 having a positive refractive power, a sixth lens group L6 having a negative refractive power and a seventh lens group L7 having a positive refractive power. An aperture stop is disposed between the third lens group L3 and the fourth lens group L4.

The negative lens (GnA) formed of the material A corresponds to a concave lens disposed at a second position from the object side in the first lens group L1. The positive lens (GpC) formed of the material C corresponds to a convex lens disposed at a third position from the object side in the first lens group L1.

The diffractive grating is formed on the image side lens surface (positive lens GpC side lens surface) of the negative lens GnA, and the other diffractive grating formed of the material B is brought into contact and joined with the diffractive grating formed of the material A to form a single diffractive optical element (Ldoe). The negative lens GnA and the positive lens GpC are joined with each other to form a cemented lens, and their cemented (joined) surface is the diffractive surface. The diffractive surface (diffractive grating) is disposed closer to the object than the aperture stop S.

In the zoom lens having such a configuration, focusing from an infinitely far object to a close object is performed by moving the entire sixth lens group L6 (Lfo) to the image side. Moreover, reduction of image blur caused due to camera shaking (hand jiggling) is performed by moving the entire second lens group L2 (LIS) in directions orthogonal to the optical axis.

In addition, when performing variation of magnification from the wide-angle end to the telephoto end, the first to sixth lens groups L1 to L6 are moved from the image side to the object side. In the variation of magnification, the seventh lens group L7 is fixed (unmoved).

This embodiment provides the diffractive optical element (Ldoe) at a position where a paraxial axial ray is high and a paraxial axial ray is also high (that is, a position of the cemented surface of the cemented lens in the first lens group L1) to correct longitudinal chromatic aberration and chromatic aberration of magnification. Moreover, using the low-melting-point glass (material A) as the material of the negative lens GnA in the first lens group L1 enables provision of the diffractive grating directly on the image side lens surface (cemented surface) of the negative lens GnA. Furthermore, using the material C as the material of the positive lens GpC in the first lens group L1 enables assistance of correction of the chromatic aberration in the optical system.

Figure 10:
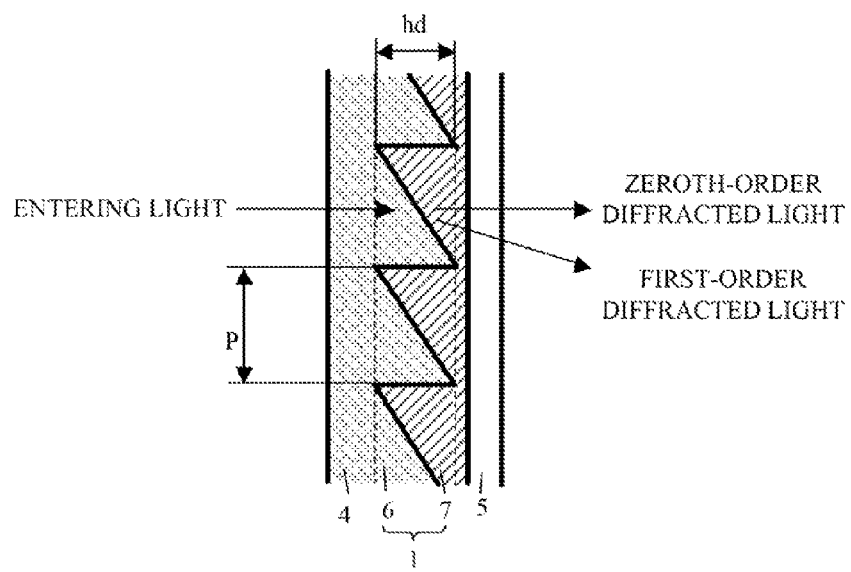
FIG. 10 shows the configuration of a diffractive optical element in each of Embodiments 1-4.

Description will here be made of the configuration of the diffractive optical element (DOE) to be used in this embodiment and other embodiments described later with reference to FIG. 10. FIG. 10 shows a two contacted layer DOE.

A first diffractive grating 6 is formed on a surface of a substrate 4. A second diffractive grating formed of an ultraviolet curable resin or a fine particle dispersed material is formed on another substrate 5. Bringing the second diffractive grating 7 into contact with the first diffractive grating 6 without an air layer therebetween causes the first and second diffractive gratings 6 and 7 to serve as a single diffractive optical element. The first and second diffractive gratings 6 and 7 have a same thickness hd.

The substrate 4 corresponds to the negative lens GnA formed of the low-melting-point glass (material A), which means that the first diffractive grating 6 is formed on the lens surface of the negative lens GnA. The second diffractive grating 7 corresponds to the diffractive grating formed of the material B. The substrate 5 corresponds to the positive lens GpC in this embodiment, and it corresponds to a lens other than the positive lens GpC in the other embodiments.

As to shapes of the first and second diffractive gratins 6 and 7, the first diffractive grating 6 has a shape in which the grating thickness monotonously increases from an upper part downward in FIG. 10. On the other hand, the second diffractive grating 7 has a shape in which the grating thickness monotonously decreases from the upper part downward in FIG. 10.

Moreover, as shown in FIG. 10, when light enters the DOE from a left side, first-order diffracted light propagates rightward and downward, and zeroth-order diffracted light propagates straight (horizontally).

Figure 11A:
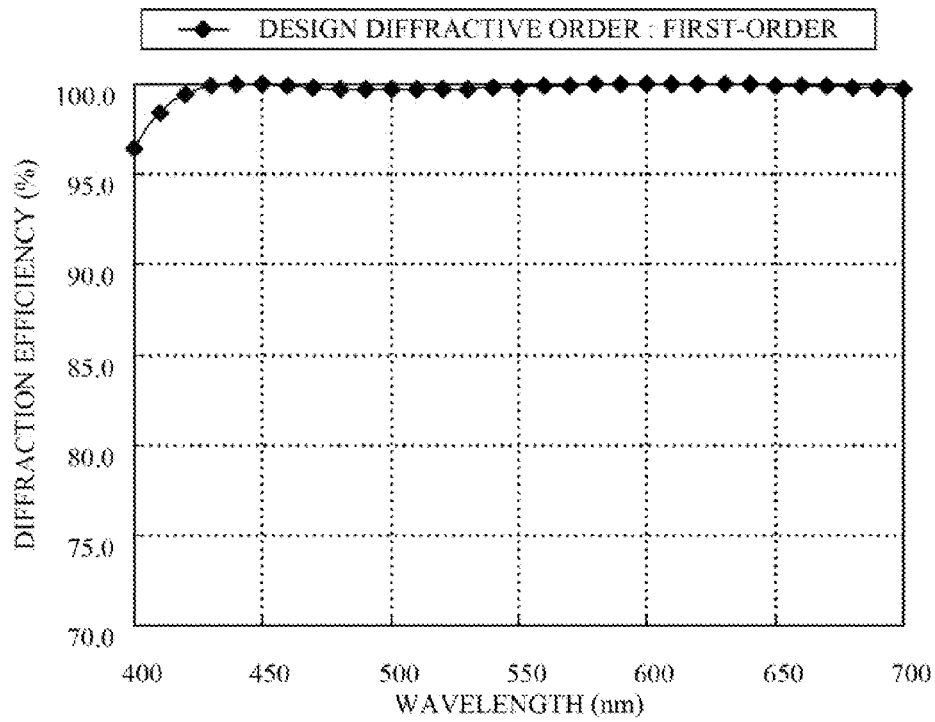
FIGS. 11A and 11B show wavelength dependence characteristics of diffraction efficiency of the diffractive optical element of Numerical Example 1.
Figure 11B:
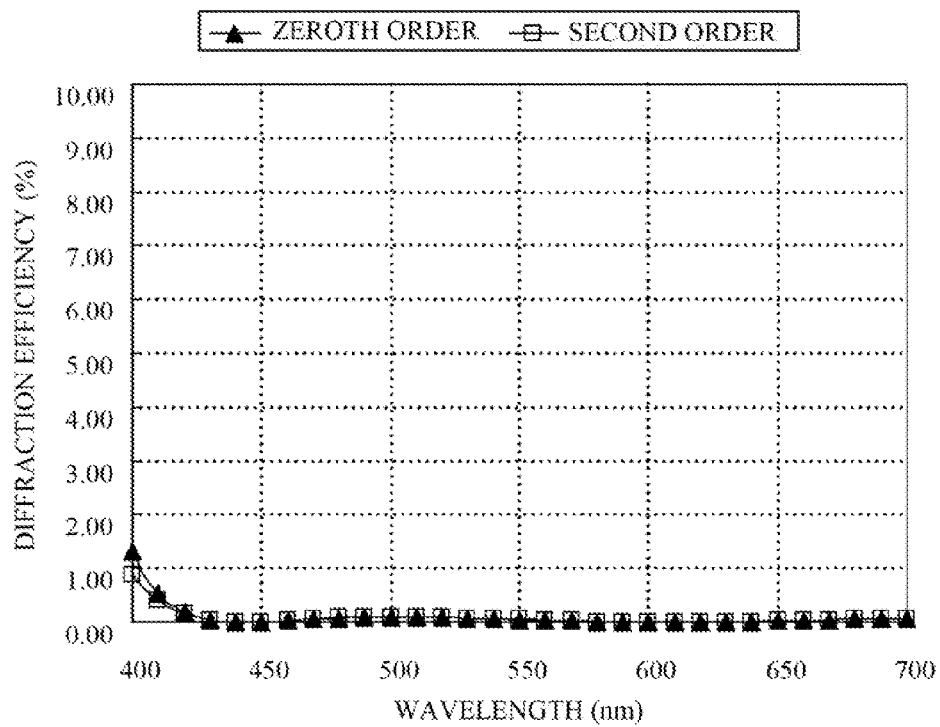

FIG. 11A shows a wavelength dependence characteristic of diffraction efficiency of the two contacted layer DOE in this embodiment for the first-order diffracted light, which is a design diffractive order diffracted light, and FIG. 11B shows wavelength dependence characteristics of diffraction efficiency for zeroth-order diffracted light and second-order diffracted light, which are diffracted lights of diffractive orders equal to a design diffractive order ±1. In each figure, a vertical axis shows diffraction efficiency (%), and a horizontal axis shows wavelength (nm).

In this embodiment, the first diffractive grating 6 is formed of the material A whose ndA and vdA are respectively 1.810 and 41.0, and the second diffractive grating 7 is formed of the material B whose ndB and vdB are respectively 1.696 and 14.5. The grating thickness hd of each of the first and second diffractive gratings 6 and 7 is 5.18 µm, which is small. Moreover, the grating pitch P is 200 µm.

The two contacted layer DOE in this embodiment achieves, regardless of such a small grating thickness, a high diffraction efficiency of about 96.0% or more for the design diffractive order light (first-order diffracted light) in an entire use wavelength range such as a visible wavelength range, and suppresses the diffraction efficiency of the unnecessary diffracted light (zeroth- and second-order diffracted lights) to about 1.4% or less in the entire use wavelength range.

Next, comparison will be made of the diffraction efficiency for the obliquely entering light of the DOE in this embodiment whose grating thickness is small and that of a conventional DOE whose grating thickness is larger than that of the DOE in this embodiment. The conventional DOE is a two contacted layer DOE as well as the DOE in this embodiment. Moreover, in the conventional DOE, a first diffraction grating is formed of a material whose nd1 and vd1 are respectively 1.714 and 38.9, and a second diffraction grating is formed of a material whose nd2 and vd2 are respectively 1.647 and 20.7. The grating thickness hd of each of the first and second diffractive gratings is 8.86 µm.

Figure 16A:
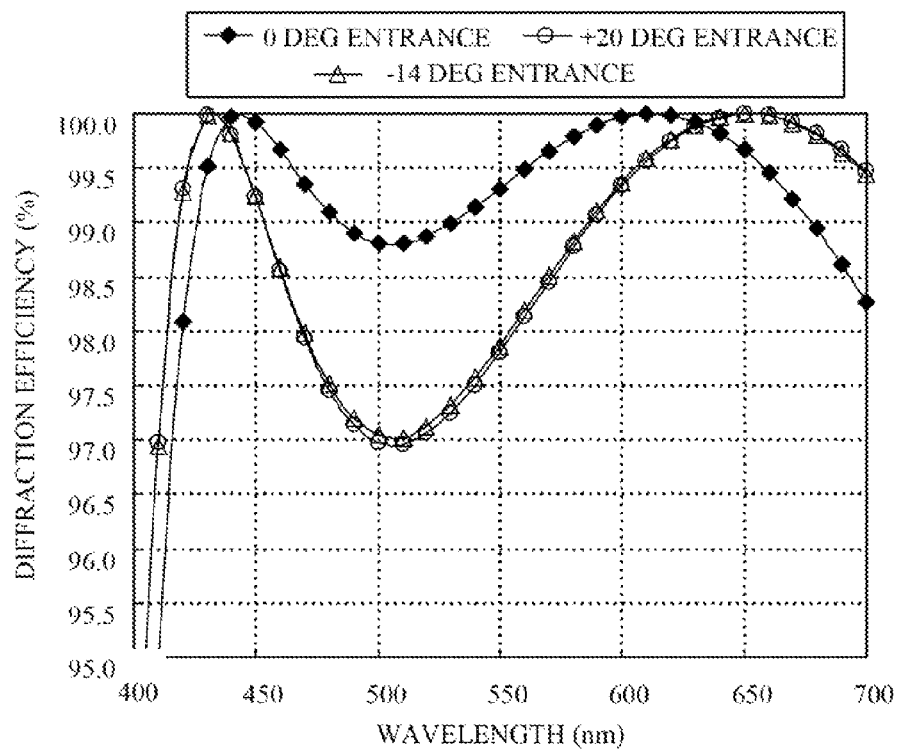
FIGS. 16A and 16B show wavelength dependence characteristics of diffraction efficiency of a conventional diffractive optical element and those of the diffractive optical element in the embodiment.
Figure 16B:
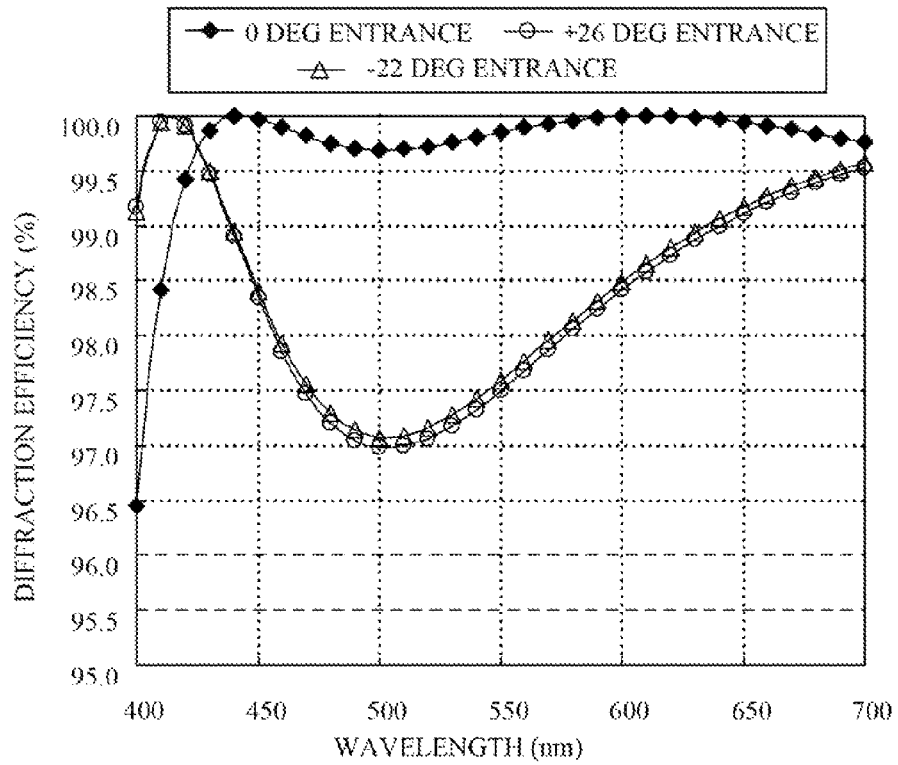

When investigating an incident angle range where the diffraction efficiency near a wavelength of 500 nm becomes 97% or more with reference to 0-degree entering light (perpendicularly entering light), the conventional DOE provided a result shown in FIG. 16A. That is, the incident angle range where the diffraction efficiency near the wavelength of 500 nm becomes 97% or more was a range of −14 to +20 degrees, which is an angle range of 34 degrees.

On the other hand, as to the DOE in this embodiment, the incident angle range where the diffraction efficiency near the wavelength of 500 nm becomes 97% or more was a range of −22 to +26 degrees, which is a significantly larger angle range of 48 degrees than that of the conventional DOE. Thus, the DOE in this embodiment has a significantly improved diffraction efficiency for the obliquely entering light as compared with the conventional DOE.

As described above, the zoom lens of this embodiment can correct the various aberrations, especially the longitudinal chromatic aberration and the chromatic aberration of magnification. Moreover, the zoom lens of this embodiment can reduce the grating thickness of the diffractive grating (that is, of the DOE), which makes it possible to suppress the deterioration of the diffraction efficiency for the obliquely entering light and to reduce the unnecessary diffracted light (flare or ghost) generated due to entrance of the obliquely entering light to the DOE. Thus, the zoom lens of this embodiment provides, in image pickup therethrough, a good captured image including little influence of the aberration and little flare or ghost.

[Embodiment 2]

The optical system of Embodiment 2 shown in FIG. 3 constitutes a telephoto zoom lens used for the above-described image pickup apparatus (optical apparatus).

The zoom lens includes, in order from the object side, a first lens group L1 having a positive refractive power, a second lens group L2 having a negative refractive power, a third lens group L3 having a positive refractive power, a fourth lens group L4 having a positive refractive power and a fifth lens group L5 having a negative refractive power. An aperture stop S is disposed between the second lens group L2 and the third lens group L3.

The negative lens (GnA) formed of the material A corresponds to a concave lens disposed at a first position from the object side in the first lens group L1. The positive lens (GpC) formed of the material C corresponds to a convex lens disposed at a third position from the object side in the first lens group L1.

The diffractive grating is formed on the image side lens surface of the negative lens GnA, and the other diffractive grating formed of the material B is brought into contact and joined with the diffractive grating formed of the material A to form a single diffractive optical element (Ldoe). The negative lens GnA and a convex lens disposed at a second position from the object side in the first lens group L1 are joined with each other to form a cemented lens, and their cemented (joined) surface is the diffractive surface. The diffractive surface (diffractive grating) is disposed closer to the object than the aperture stop S.

In the zoom lens having such a configuration, focusing from an infinitely far object to a close object is performed by moving the entire fifth lens group L5 (Lfo) to the image side.

In addition, when performing variation of magnification from the wide-angle end to the telephoto end, the first to fifth lens groups L1 to L5 are moved from the image side to the object side.

This embodiment provides the diffractive optical element (Ldoe) at a position where a paraxial axial ray is high and a paraxial axial ray is also high (that is, a position of the cemented surface of the cemented lens in the first lens group L1) to correct longitudinal chromatic aberration and chromatic aberration of magnification. Moreover, using the low-melting-point glass (material A) as the material of the negative lens GnA in the first lens group L1 enables provision of the diffractive grating directly on the image side lens surface (cemented surface) of the negative lens GnA. Furthermore, using the material C as the material of the positive lens GpC in the first lens group L1 enables assistance of correction of the chromatic aberration in the optical system.

The configuration of the diffractive optical element (DOE) is same as that described in Embodiment 1 with reference to FIG. 10.

Figure 12A:
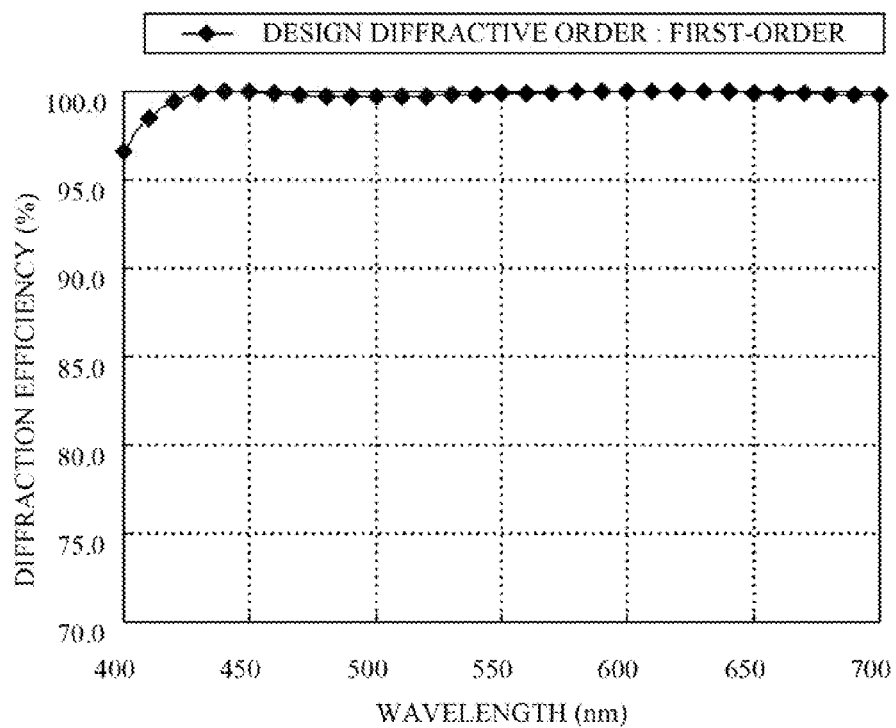
FIGS. 12A and 12B show wavelength dependence characteristics of diffraction efficiency of the diffractive optical element of Numerical Example 2.
Figure 12B:
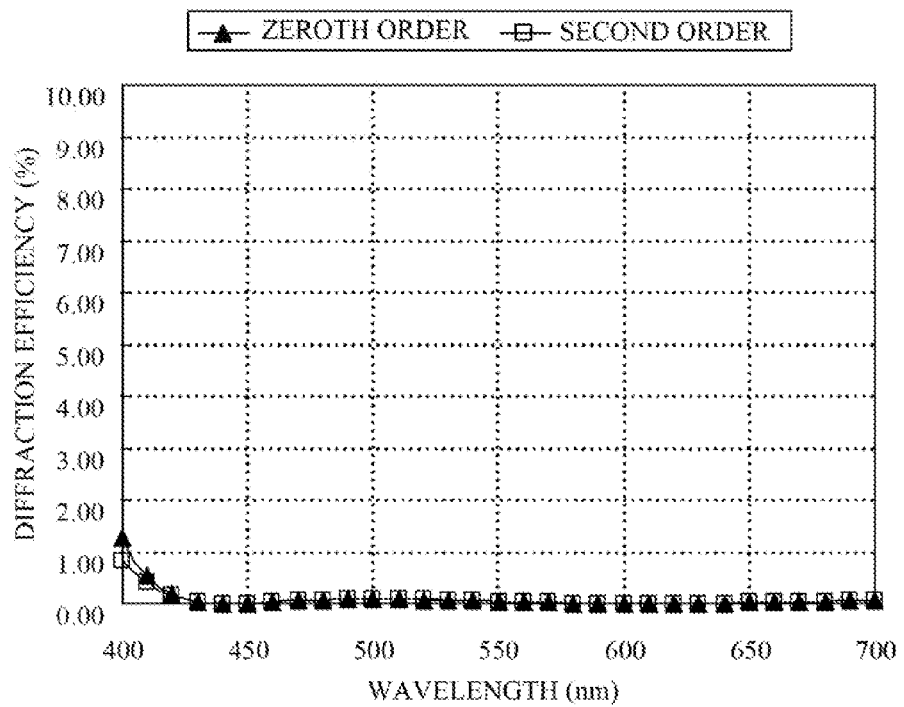

FIG. 12A shows a wavelength dependence characteristic of diffraction efficiency of the two contacted layer DOE in this embodiment for the first-order diffracted light, which is a design diffractive order diffracted light, and FIG. 12B shows wavelength dependence characteristics of diffraction efficiency for zeroth-order diffracted light and second-order diffracted light, which are diffracted lights of diffractive orders equal to a design diffractive order ±1. In each figure, a vertical axis shows diffraction efficiency (%), and a horizontal axis shows wavelength (nm). In this embodiment, the first diffractive grating 6 is formed of the material A whose ndA and vdA are respectively 1.821 and 42.7, and the second diffractive grating 7 is formed of the material B whose ndB and vdB are respectively 1.700 and 14.2. The grating thickness hd of each of the first and second diffractive gratings 6 and 7 is 4.88 µm, which is small. Moreover, the grating pitch P is 200 µm.

The two contacted layer DOE in this embodiment achieves, regardless of such a small grating thickness, a high diffraction efficiency of about 96.0% or more for the design diffractive order light (first-order diffracted light) in the entire use wavelength range, and suppresses the diffraction efficiency of the unnecessary diffracted light (zeroth- and second-order diffracted lights) to about 1.3% or less in the entire use wavelength range. Furthermore, though not shown in a figure, the DOE in this embodiment has a significantly improved diffraction efficiency for the obliquely entering light, as well as the DOE in Embodiment 1, as compared with the conventional DOE.

As described above, the zoom lens of this embodiment can correct the various aberrations, especially the longitudinal chromatic aberration and the chromatic aberration of magnification. Moreover, the zoom lens of this embodiment can reduce the grating thickness of the diffractive grating (that is, of the DOE), which makes it possible to suppress the deterioration of the diffraction efficiency for the obliquely entering light and to reduce the unnecessary diffracted light (flare or ghost) generated due to entrance of the obliquely entering light to the DOE. Thus, the zoom lens of this embodiment provides, in image pickup therethrough, a good captured image including little influence of the aberration and little flare or ghost.

[Embodiment 3]

The optical system of Embodiment 3 shown in FIG. 5 constitutes a single focal length (single focus) wide-angle lens to be used for the above-described image pickup apparatus (optical apparatus).

In this wide-angle lens, in order from the object side, reference character LF denotes a front group having a negative refractive power, and reference character LR denotes a rear group having a positive refractive power. Reference character S denotes an aperture stop, and it is disposed between the front and rear groups LF and LR.

The negative lens (GnA) formed of the material A corresponds to a concave lens disposed closest to the object in the front group LF. The positive lens (GpC) formed of the material C corresponds to a convex lens disposed at a third position from the image side in the rear group LR.

The diffractive grating is formed on the object side lens surface of the negative lens GnA, and the other diffractive grating formed of the material B is brought into contact and joined with the diffractive grating formed of the material A to form a single diffractive optical element (Ldoe). The negative lens GnA and a convex lens disposed at a second position from the image side in the rear group LR form a most-image side cemented lens in the rear group LR, and their cemented (joined) surface is the diffractive surface. The diffractive surface (diffractive grating) is disposed closer to the image than the aperture stop S.

In the wide-angle lens having such a configuration, focusing from an infinitely far object to a close object is performed by moving a part (Lfo) of the front group LF to the image side.

This embodiment provides the diffractive optical element (Ldoe) at a position where a paraxial axial ray is high and a paraxial axial ray is also high (that is, a position of the cemented surface of the most-image side cemented lens in the rear group LR) to correct longitudinal chromatic aberration and chromatic aberration of magnification. Moreover, using the low-melting-point glass (material A) as the material of the negative lens GnA in the rear group LR enables provision of the diffractive grating directly on the object side lens surface (cemented surface) of the negative lens GnA. Furthermore, using the material C as the material of the positive lens GpC in the rear group LR enables assistance of correction of the chromatic aberration in the optical system.

The configuration of the diffractive optical element (DOE) is same as that described in Embodiment 1 with reference to FIG. 10. However, directions of first-order diffractive light and zeroth-order diffractive light that are respectively entering light and exiting light are reverse to those shown in FIG. 10.

Figure 13A:
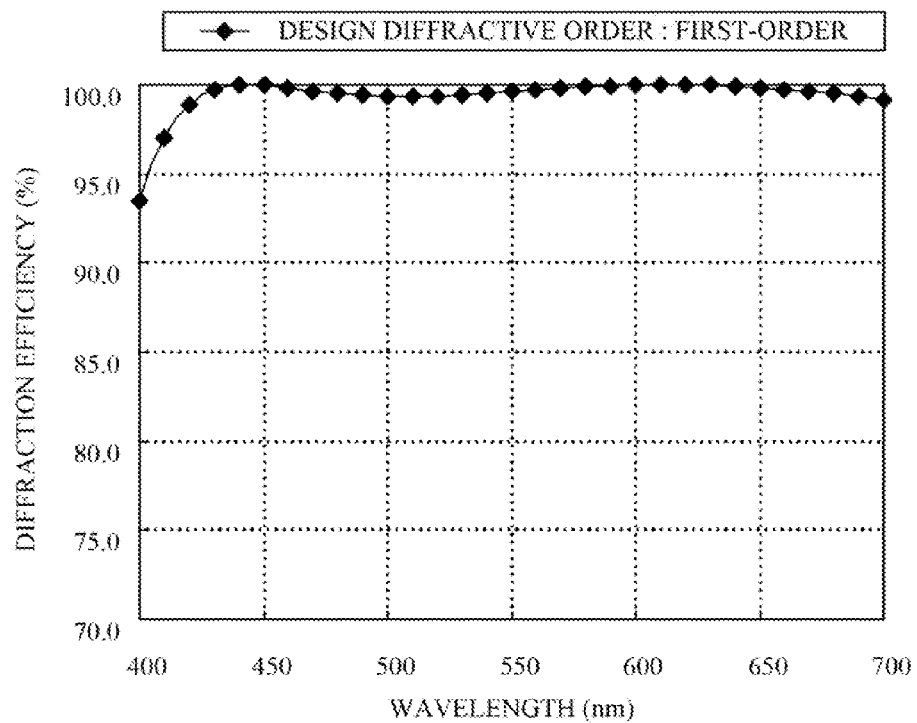
FIGS. 13A and 13B show wavelength dependence characteristics of diffraction efficiency of the diffractive optical element of Numerical Example 3.
Figure 13B:
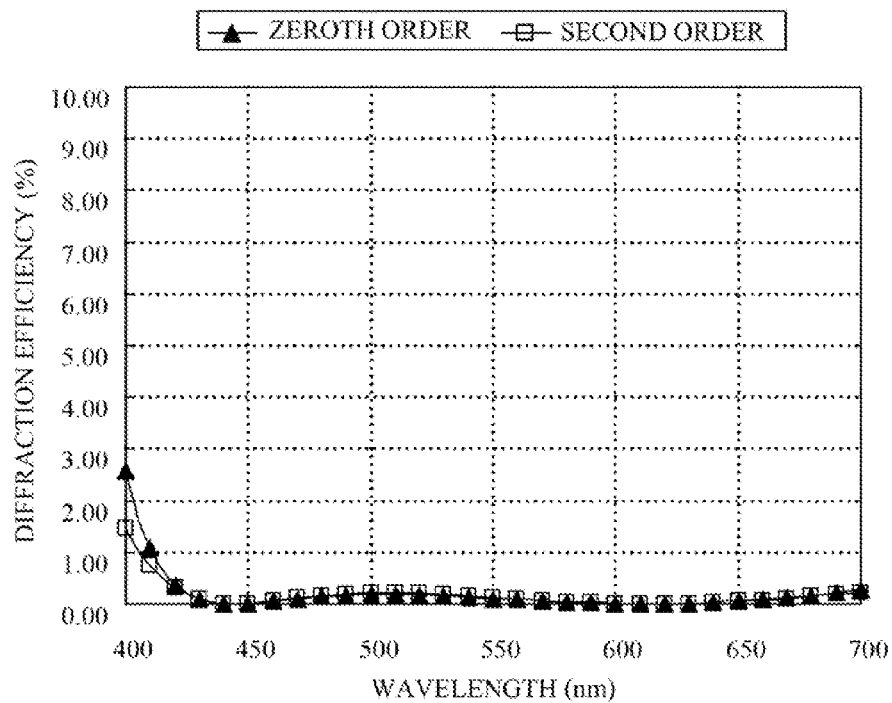

FIG. 13A shows a wavelength dependence characteristic of diffraction efficiency of the two contacted layer DOE in this embodiment for the first-order diffracted light, which is a design diffractive order diffracted light, and FIG. 13B shows wavelength dependence characteristics of diffraction efficiency for zeroth-order diffracted light and second-order diffracted light, which are diffracted lights of diffractive orders equal to a design diffractive order ±1. In each figure, a vertical axis shows diffraction efficiency (%), and a horizontal axis shows wavelength (nm). In this embodiment, the first diffractive grating 6 is formed of the material A whose ndA and vdA are respectively 1.772 and 50.0, and the second diffractive grating 7 is formed of the material B whose ndB and vdB are respectively 1.668 and 17.2. The grating thickness hd of each of the first and second diffractive gratings 6 and 7 is 5.71 µm, which is small. Moreover, the grating pitch P is 200 µm.

The two contacted layer DOE in this embodiment achieves, regardless of such a small grating thickness, a high diffraction efficiency of about 93.0% or more for the design diffractive order light (first-order diffracted light) in the entire use wavelength range, and suppresses the diffraction efficiency of the unnecessary diffracted light (zeroth- and second-order diffracted lights) to about 2.6% or less in the entire use wavelength range. Furthermore, though not shown in a figure, the DOE in this embodiment has a significantly improved diffraction efficiency for the obliquely entering light, as well as the DOE in Embodiment 1, as compared with the conventional DOE.

As described above, the wide-angle lens of this embodiment can correct the various aberrations, especially the longitudinal chromatic aberration and the chromatic aberration of magnification. Moreover, the wide-angle lens of this embodiment can reduce the grating thickness of the diffractive grating (that is, of the DOE), which makes it possible to suppress the deterioration of the diffraction efficiency for the obliquely entering light and to reduce the unnecessary diffracted light (flare or ghost) generated due to entrance of the obliquely entering light to the DOE. Thus, the wide-angle lens of this embodiment provides, in image pickup therethrough, a good captured image including little influence of the aberration and little flare or ghost.

[Embodiment 4]

The optical system of Embodiment 4 shown in FIG. 7 constitutes a single focal length super-telephoto lens to be used for the above-described image pickup apparatus (optical apparatus).

In this super-telephoto lens, in order from the object side, reference character LF denotes a front group having a positive refractive power, and reference character LR denotes a rear group having a positive refractive power. Reference character S denotes an aperture stop, and it is disposed between the front and rear groups LF and LR.

The negative lens (GnA) formed of the material A corresponds to a concave lens disposed at a fourth position from the object side in the front group LF. The positive lens (GpC) formed of the material C corresponds to a convex lens disposed at a second position from the object side in the front group LF.

The diffractive grating is formed on the object side lens surface of the negative lens GnA, and the other diffractive grating formed of the material B is brought into contact and joined with the diffractive grating formed of the material A to form a single diffractive optical element (Ldoe). The negative lens GnA and a convex lens disposed at a third position from the object side in the front group LF form an object side cemented lens in the front group LF, and their cemented (joined) surface is the diffractive surface. The diffractive surface (diffractive grating) is disposed closer to the object than the aperture stop S.

In the super-telephoto lens having such a configuration, focusing from an infinitely far object to a close object is performed by moving a part (Lfo) of the front group LF to the image side.

This embodiment provides the diffractive optical element (Ldoe) at a position where a paraxial axial ray is high and a paraxial axial ray is also high (that is, a position of the cemented surface of the object side cemented lens in the front group LF) to correct longitudinal chromatic aberration and chromatic aberration of magnification. Moreover, using the low-melting-point glass (material A) as the material of the negative lens GnA in the front group LF enables provision of the diffractive grating directly on the object side lens surface (cemented surface) of the negative lens GnA. Furthermore, using the material C as the material of the positive lens GpC in the front group LF enables assistance of correction of the chromatic aberration in the optical system.

The configuration of the diffractive optical element (DOE) is same as that described in Embodiment 1 with reference to FIG. 10.

Figure 14A:
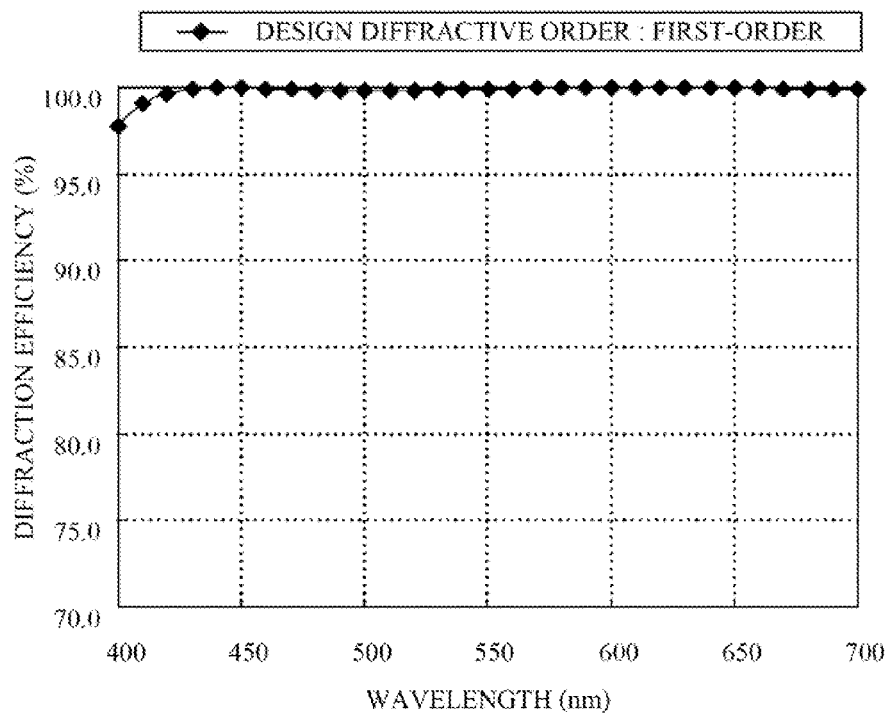
FIGS. 14A and 14B show wavelength dependence characteristics of diffraction efficiency of the diffractive optical element of Numerical Example 4.
Figure 14B:
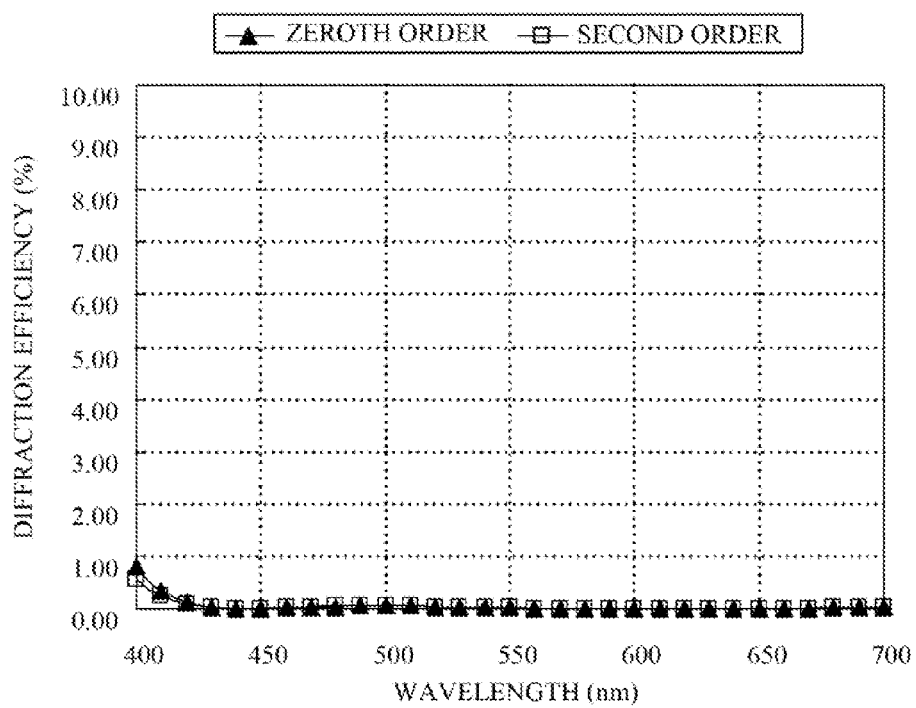

FIG. 14A shows a wavelength dependence characteristic of diffraction efficiency of the two contacted layer DOE in this embodiment for the first-order diffracted light, which is a design diffractive order diffracted light, and FIG. 14B shows wavelength dependence characteristics of diffraction efficiency for zeroth-order diffracted light and second-order diffracted light, which are diffracted lights of diffractive orders equal to a design diffractive order ±1. In each figure, a vertical axis shows diffraction efficiency (%), and a horizontal axis shows wavelength (nm). In this embodiment, the first diffractive grating 6 is formed of the material A whose ndA and vdA are respectively 1.854 and 40.4, and the second diffractive grating 7 is formed of the material B whose ndB and vdB are respectively 1.720 and 12.9. The grating thickness hd of each of the first and second diffractive gratings 6 and 7 is 4.40 µm, which is small. Moreover, the grating pitch P is 200 µm.

The two contacted layer DOE in this embodiment achieves, regardless of such a small grating thickness, a high diffraction efficiency of about 97.0% or more for the design diffractive order light (first-order diffracted light) in the entire use wavelength range, and suppresses the diffraction efficiency of the unnecessary diffracted light (zeroth- and second-order diffracted lights) to about 1.0% or less in the entire use wavelength range. Furthermore, though not shown in a figure, the DOE in this embodiment has a significantly improved diffraction efficiency for the obliquely entering light, as well as the DOE in Embodiment 1, as compared with the conventional DOE.

As described above, the super-telephoto lens of this embodiment can correct the various aberrations, especially the longitudinal chromatic aberration and the chromatic aberration of magnification. Moreover, the super-telephoto lens of this embodiment can reduce the grating thickness of the diffractive grating (that is, of the DOE), which makes it possible to suppress the deterioration of the diffraction efficiency for the obliquely entering light and to reduce the unnecessary diffracted light (flare or ghost) generated due to entrance of the obliquely entering light to the DOE. Thus, the wide-angle lens of this embodiment provides, in image pickup therethrough, a good captured image including little influence of the aberration and little flare or ghost.

Next, description will be made of the characteristics of the diffractive optical element (DOE) used in the above-described embodiments. The DOE has, as optical characteristics, a negative dispersion characteristic and anomalous dispersion characteristic, which is different from conventional refractive optical elements formed of glass, plastic or the like. Specifically, the DOE has an Abbe number vd of −3.453 and a partial dispersion ratio θgF of 0.296. Appropriately using the DOE having such optical characteristics for a dioptric system (refractive optical system) makes it possible to sufficiently correct chromatic aberration generated in the dioptric system.

The grating pitch of the DOE used in each embodiment may be changed to provide an aspheric effect to the DOE.

Moreover, if, on the optical surface (lens surface) on which the DOE is formed, an axial ray and an off-axis ray that pass through the optical system have a difference in incident angle at their respective incident positions with respect to a normal to the optical surface, the diffraction efficiency may be deteriorated. Thus, it is desirable to provide the DOE on a lens surface as concentric for the axial and off-axis rays as possible.

The optical surface on which the DOE is formed may be any of a spherical surface, a planar surface, an aspheric surface and a quadric surface. Moreover, although each embodiment has described the case where the DOE is formed on the cemented surface of the cemented lens, the DOE may be formed on an optical surface other than the cemented surface of the cemented lens.

In addition, a method of producing the DOE in each embodiment may be a method forming a binary optics shape directly on a lens surface with photoresist and a method performing a replica forming or mold forming by using a mold produced by a similar method to the above-described method. Moreover, employing a sawtooth kinoform as the grating shape can improve the diffraction efficiency to a value close to an ideal diffraction efficiency.

Numerical Examples 1 to 4 respectively corresponding to Embodiments 1 to 4 will hereinafter be shown. In each numerical example, ri represents a curvature radius of an i-th lens surface that is counted from the object side, di represents a distance between the i-th lens surface and an (i+1)-th lens surface on the optical axis in a reference state. Moreover, ndi and vdi respectively represent a refractive index and an Abbe number for the d-line of an i-th optical element that is counted from the object side. Fno represents an F-number. In addition, "e±M" means "×10$^{±M}$".

A phase shape $\psi$ of the diffractive optical element is expressed by the following expression where m represents a diffractive order of diffracted light, $\lambda 0$ represents a design wavelength, h represents a height from the optical axis in a direction orthogonal to the optical axis, and Ci (i=1, 2, 3, . . . ) represents a phase coefficient:

$$\psi(h,m) = (2\pi/m\lambda 0) \times (C1 \cdot h^2 + C2 \cdot h^4 + C3 \cdot h^6 + \ldots).$$

Moreover, an aspheric surface is expressed by the following expression where X represents a displacement amount from a surface apex in a direction of the optical axis, h represents a height from the optical axis in the direction orthogonal to the optical axis, r represents a paraxial curvature radius, k represents a conic constant, and B, C, D and E represent aspheric coefficients:

$$X(h) = \frac{(1/r)h^2}{1 + \sqrt{1 - (1+k)(h/r)^2}} + Bh^4 + Ch^6 + Dh^8 + Eh^{10} + \ldots$$

Relationships between the respective conditions and Numerical Examples 1 to 4 are collectively shown in Table 1.

NUMERICAL EXAMPLE 1

| | UNIT mm | | | | |
|---|---|---|---|---|---|
| SURFACE DATA | | | | | |
| SURFACE NO. i | ri | di | ndi | vdi | EFFECTIVE DIAMETER |
| 1 | ∞ | 0.15 | | | 52.65 |
| 2 | 82.008 | 5.41 | 1.48749 | 70.2 | 52.00 |
| 3 | 1515.255 | 0.15 | | | 51.56 |
| 4 | 71.010 | 1.50 | 1.81000 | 41.0 | 49.54 |
| 5(DIFFRACTIVE SURFACE) | 44.854 | 7.11 | 1.48749 | 70.2 | 47.33 |
| 6 | 261.187 | (VARIABLE) | | | 46.69 |
| 7 | ∞ | 1.48 | | | 24.44 |
| 8 | 765.788 | 1.50 | 1.61800 | 63.3 | 22.96 |
| 9 | 66.622 | 0.94 | | | 21.67 |
| 10 | 602.481 | 1.50 | 1.60300 | 65.4 | 21.56 |
| 11 | 18.168 | 2.84 | 1.67270 | 32.1 | 20.68 |
| 12 | 30.105 | (VARIABLE) | | | 20.43 |
| 13 | 23.327 | 1.50 | 1.92286 | 18.9 | 20.75 |
| 14 | 18.216 | 4.26 | 1.56384 | 60.7 | 19.98 |
| 15 | 385.771 | 1.00 | | | 19.74 |
| 16(APERTURE STOP) | ∞ | (VARIABLE) | | | 16.98 |
| 17 | −24.760 | 1.50 | 1.53996 | 59.5 | 17.48 |
| 18 | 26.754 | 2.87 | 1.74000 | 28.3 | 18.22 |
| 19 | 333.492 | (VARIABLE) | | | 18.30 |
| 20 | −109.907 | 3.15 | 1.56384 | 60.7 | 19.26 |
| 21 | −23.141 | 0.15 | | | 19.50 |
| 22 | 91.049 | 4.79 | 1.48749 | 70.2 | 19.91 |
| 23 | −19.036 | 1.50 | 2.00330 | 28.3 | 20.03 |
| 24 | −52.955 | 0.15 | | | 21.25 |
| 25 | 41.984 | 2.98 | 1.81600 | 46.6 | 22.15 |
| 26 | −676.802 | (VARIABLE) | | | 22.06 |
| 27 | 151.387 | 1.50 | 1.88300 | 40.8 | 20.14 |

-continued

| UNIT mm | | | | |
|---|---|---|---|---|
| 28 | 31.412 | 1.69 | | 19.74 |
| 29 | 996.697 | 2.50 | 1.92286 18.9 | 19.79 |
| 30 | −48.074 | 1.50 | 1.88300 40.8 | 20.01 |
| 31 | 51.119 | (VARIABLE) | | 20.56 |
| 32 | 57.794 | 3.06 | 1.64769 33.8 | 36.10 |
| 33 | 133.204 | 40.08 | | 36.12 |
| IMAGE SURFACE | ∞ | | | |

ASPHERIC SURFACE DATA

FIFTH SURFACE (DIFFRACTIVE SURFACE)

$A2 = -5.74436e-005$ $A4 = -1.22212e-008$

VARIOUS DATA
ZOOM RATIO 4.01

| | WIDE-ANGLE | MIDDLE | TELEPHOTO |
|---|---|---|---|
| FOCAL LENGTH | 72.50 | 135.50 | 290.90 |
| F-NUMBER | 4.66 | 4.97 | 5.87 |
| ANGLE OF VIEW | 16.62 | 9.07 | 4.25 |
| IMAGE HEIGHT | 21.64 | 21.64 | 21.64 |
| ENTIRE LENS LENGTH | 144.08 | 171.47 | 204.08 |
| BF | 40.08 | 40.08 | 40.08 |
| d6 | 1.30 | 29.91 | 56.37 |
| d12 | 17.11 | 8.64 | 1.20 |
| d16 | 3.50 | 8.12 | 9.80 |
| d19 | 11.10 | 7.02 | 1.60 |
| d26 | 11.51 | 9.63 | 1.20 |
| d31 | 2.80 | 11.40 | 37.14 |
| d33 | 40.08 | 40.08 | 40.08 |
| ENTRANCE PUPIL POSITION | 40.75 | 102.38 | 215.40 |
| EXIT PUPIL POSITION | −32.18 | −44.80 | −88.42 |
| FRONT PRINCIPAL POINT POSITION | 40.50 | 21.55 | −152.22 |
| REAR PRINCIPAL POINT POSITION | −32.43 | −95.43 | −250.82 |

ZOOM LENS GROUP DATA

| GROUP | START SURFACE | FOCAL LENGTH | LENS GROUP LENGTH | FRONT PRINCIPAL POINT POSITION | REAR PRINCIPAL POINT POSITION |
|---|---|---|---|---|---|
| 1 | 1 | 121.18 | 14.32 | −0.79 | −10.17 |
| 2 | 7 | −37.93 | 8.27 | 5.15 | −0.77 |
| 3 | 13 | 52.29 | 6.76 | −1.07 | −5.53 |
| 4 | 17 | −60.64 | 4.37 | −0.09 | −2.71 |
| 5 | 20 | 27.51 | 12.72 | 4.46 | −3.66 |
| 6 | 27 | −25.70 | 7.19 | 2.50 | −1.97 |
| 7 | 32 | 155.14 | 3.06 | −1.40 | −3.23 |

SINGLE LENS DATA

| LENS | START SURFACE | FOCAL LENGTH |
|---|---|---|
| 1 | 1 | 177.63 |
| 2 | 4 | −157.05 |
| 3 | 5 | 108.52 |
| 4 | 8 | −118.17 |
| 5 | 10 | −31.10 |
| 6 | 11 | 62.16 |
| 7 | 13 | −104.87 |
| 8 | 14 | 33.77 |
| 9 | 17 | −23.57 |
| 10 | 18 | 39.15 |
| 11 | 20 | 51.32 |
| 12 | 22 | 32.76 |
| 13 | 23 | −30.29 |
| 14 | 25 | 48.54 |
| 15 | 27 | −45.15 |
| 16 | 29 | 49.75 |
| 17 | 30 | −27.86 |
| 18 | 32 | 155.14 |

NUMERICAL EXAMPLE 2

| UNIT mm | | | | | |
|---|---|---|---|---|---|
| SURFACE DATA | | | | | |
| SURFACE NO. i | ri | di | ndi | vdi | EFFECTIVE DIAMETER |
| 1 | 106.201 | 1.50 | 1.82080 | 42.7 | 52.50 |
| 2(DIFFRACTIVE SURFACE) | 49.590 | 6.04 | 1.51633 | 64.1 | 50.70 |
| 3 | 137.408 | 0.15 | | | 50.47 |
| 4 | 68.701 | 7.88 | 1.48749 | 70.2 | 50.42 |
| 5 | −186.189 | (VARIABLE) | | | 50.05 |
| 6 | −63.589 | 1.50 | 1.83481 | 42.7 | 33.94 |
| 7 | 42.816 | 0.19 | | | 33.11 |
| 8 | 43.440 | 4.43 | 1.84666 | 23.8 | 33.21 |
| 9 | 513.395 | (VARIABLE) | | | 33.26 |
| 10(APERTURE STOP) | ∞ | 0.15 | | | 26.86 |
| 11 | 72.265 | 1.50 | 1.92286 | 18.9 | 34.31 |
| 12 | 48.651 | 0.17 | | | 33.89 |
| 13 | 49.139 | 6.36 | 1.60311 | 60.6 | 33.94 |
| 14 | −75.127 | (VARIABLE) | | | 33.87 |
| 15 | 86.062 | 4.06 | 1.48749 | 70.2 | 26.38 |
| 16 | −52.393 | 1.50 | 1.83400 | 37.2 | 26.01 |
| 17 | −143.111 | 0.15 | | | 25.71 |
| 18 | 48.523 | 2.44 | 1.60300 | 65.4 | 24.84 |
| 19 | 128.516 | (VARIABLE) | | | 24.24 |
| 20 | 113.270 | 1.50 | 1.83481 | 42.7 | 16.87 |
| 21 | 26.363 | 2.44 | | | 16.48 |
| 22 | −36.292 | 1.50 | 1.83481 | 42.7 | 16.52 |
| 23 | 29.745 | 3.95 | 1.72825 | 28.5 | 18.19 |
| 24 | −40.171 | (VARIABLE) | | | 18.92 |
| IMAGE SURFACE | ∞ | | | | |

ASPHERIC SURFACE DATA

SECOND SURFACE (DIFFRACTIVE SURFACE)

A2 = −4.44322e−005  A4 = 3.97558e−009
A6 = −1.06128e−011

VARIOUS DATA
ZOOM RATIO 2.84

| | WIDE-ANGLE | MIDDLE | TELEPHOTO |
|---|---|---|---|
| FOCAL LENGTH | 103.00 | 200.00 | 292.50 |
| F-NUMBER | 4.67 | 5.44 | 5.77 |
| ANGLE OF VIEW | 11.86 | 6.17 | 4.23 |
| IMAGE HEIGHT | 21.64 | 21.64 | 21.64 |
| ENTIRE LENS LENGTH | 162.16 | 189.12 | 210.66 |
| BF | 45.16 | 58.25 | 70.16 |
| d5 | 4.40 | 30.97 | 43.19 |
| d9 | 40.36 | 14.48 | 6.50 |
| d14 | 2.90 | 25.58 | 41.30 |
| d19 | 21.93 | 12.42 | 2.10 |
| d24 | 45.16 | 58.25 | 70.16 |
| ENTRANCE PUPIL POSITION | 55.16 | 86.40 | 105.31 |
| EXIT PUPIL POSITION | −24.37 | −29.60 | −33.37 |
| FRONT PRINCIPAL POINT POSITION | 5.59 | −168.91 | −428.60 |
| REAR PRINCIPAL POINT POSITION | −57.84 | −141.75 | −222.34 |

ZOOM LENS GROUP DATA

| GROUP | START SURFACE | FOCAL LENGTH | LENS GROUP LENGTH | FRONT PRINCIPAL POINT POSITION | REAR PRINCIPAL POINT POSITION |
|---|---|---|---|---|---|
| 1 | 1 | 132.84 | 15.57 | 5.17 | −5.24 |
| 2 | 6 | −67.82 | 6.11 | 0.13 | −3.26 |
| 3 | 10 | 71.87 | 8.18 | 2.77 | −2.40 |
| 4 | 15 | 79.16 | 8.15 | 1.95 | −3.29 |
| 5 | 20 | −33.04 | 9.39 | −0.18 | −7.00 |

| UNIT mm | | |
|---|---|---|
| SINGLE LENS DATA | | |
| LENS | START SURFACE | FOCAL LENGTH |
| 1 | 1 | −115.89 |
| 2 | 2 | 144.92 |
| 3 | 4 | 104.00 |
| 4 | 6 | −30.46 |
| 5 | 8 | 55.81 |
| 6 | 11 | −166.40 |
| 7 | 13 | 50.22 |
| 8 | 15 | 67.45 |
| 9 | 16 | −99.85 |
| 10 | 18 | 127.81 |
| 11 | 20 | −41.49 |
| 12 | 22 | −19.38 |
| 13 | 23 | 24.04 |

NUMERICAL EXAMPLE 3

| UNIT mm | | | | | |
|---|---|---|---|---|---|
| SURFACE DATA | | | | | |
| SURFACE NO. i | ri | di | ndi | vdi | EFFECTIVE DIAMETER |
| 1 | ∞ | 0.00 | | | 121.00 |
| 2 | 49.847 | 5.79 | 1.77250 | 49.6 | 73.07 |
| 3 | 29.708 | 8.66 | | | 54.13 |
| 4* | 61.579 | 6.83 | 1.66910 | 55.4 | 52.00 |
| 5 | 58.051 | 0.15 | | | 47.88 |
| 6 | 32.620 | 1.80 | 1.77250 | 49.6 | 40.39 |
| 7 | 15.393 | 9.26 | | | 28.73 |
| 8 | 126.019 | 1.80 | 1.78800 | 47.4 | 28.43 |
| 9 | 18.628 | 9.56 | | | 23.93 |
| 10 | 45.981 | 2.00 | 1.88300 | 40.8 | 22.06 |
| 11 | 18.224 | 5.11 | 1.84666 | 23.8 | 20.59 |
| 12 | −117.898 | 2.05 | | | 20.05 |
| 13 | −143.664 | 10.07 | 1.48749 | 70.2 | 18.08 |
| 14 | −13.793 | 1.20 | 1.84666 | 23.8 | 14.13 |
| 15 | −18.133 | 4.95 | | | 14.68 |
| 16 | −21.027 | 1.20 | 2.00330 | 28.3 | 14.17 |
| 17 | −30.415 | 1.00 | | | 14.64 |
| 18(APERTURE STOP) | ∞ | 3.77 | | | 14.07 |
| 19 | 15.305 | 3.19 | 1.51633 | 64.1 | 15.56 |
| 20 | 38.347 | 1.20 | 1.88300 | 40.8 | 15.00 |
| 21 | 22.660 | 1.06 | | | 14.45 |
| 22 | 79.792 | 1.20 | 2.00330 | 28.3 | 14.45 |
| 23 | 12.385 | 1.50 | 1.85026 | 32.3 | 14.22 |
| 24 | 17.477 | 3.28 | 1.48749 | 70.2 | 14.71 |
| 25 | −70.231 | 0.15 | | | 16.03 |
| 26 | 47.883 | 6.60 | 1.64769 | 33.8 | 18.70 |
| 27(DIFFRACTIVE SURFACE) | −14.593 | 1.80 | 1.77200 | 50.0 | 19.83 |
| 28 | −24.890 | 38.47 | | | 22.00 |
| IMAGE SURFACE | ∞ | | | | |

ASPHERIC SURFACE DATA

FOURTH SURFACE

K = 0.00000e+000 A4 = 7.67518e−006
A6 = 1.77447e−009 A8 = −5.21311e−012
A10 = 9.03671e−015
TWENTY-SEVENTH SURFACE (DIFFRACTIVE SURFACE)

A2 = −8.95945e−004 A4 = 3.28200e−006

VARIOUS DATA

| FOCAL LENGTH | 14.36 |
|---|---|
| F-NUMBER | 2.89 |
| ANGLE OF VIEW | 56.38 |

-continued

| UNIT mm | |
|---|---|
| IMAGE HEIGHT | 21.60 |
| ENTIRE LENS LENGTH | 133.66 |
| BF | 38.47 |
| ENTRANCE PUPIL POSITION | 31.01 |
| EXIT PUPIL POSITION | −28.31 |
| FRONT PRINCIPAL POINT POSITION | 42.28 |
| REAR PRINCIPAL POINT POSITION | 24.11 |

| SINGLE LENS DATA | | |
|---|---|---|
| LENS | START SURFACE | FOCAL LENGTH |
| 1 | 1 | −108.83 |
| 2 | 4 | −6775.85 |
| 3 | 6 | −39.53 |
| 4 | 8 | −27.95 |
| 5 | 10 | −35.38 |
| 6 | 11 | 18.97 |
| 7 | 13 | 30.52 |
| 8 | 14 | −77.95 |
| 9 | 16 | −72.54 |
| 10 | 19 | 47.11 |
| 11 | 20 | −65.07 |
| 12 | 22 | −14.74 |
| 13 | 23 | 44.03 |
| 14 | 24 | 29.06 |
| 15 | 26 | 17.48 |
| 16 | 27 | −54.10 |

NUMERICAL EXAMPLE 4

| UNIT mm | | | | |
|---|---|---|---|---|
| SURFACE DATA | | | | |
| SURFACE NO. i | ri | di | ndi | vdi | EFFECTIVE DIAMETER |
| 1 | 143.126 | 26.92 | 1.48749 | 70.2 | 141.99 |
| 2 | −780.617 | 33.17 | | | 140.21 |
| 3 | 114.623 | 13.11 | 1.49700 | 81.5 | 108.17 |
| 4 | 634.138 | 5.60 | | | 106.80 |
| 5 | −452.511 | 4.00 | 1.85026 | 32.3 | 106.58 |
| 6(DIFFRACTIVE SURFACE) | −334.793 | 4.00 | 1.85400 | 40.4 | 105.34 |
| 7 | 192.486 | 0.15 | | | 99.21 |
| 8 | 104.402 | 14.96 | 1.43387 | 95.1 | 97.38 |
| 9 | −1044.208 | 0.15 | | | 96.42 |
| 10 | 59.016 | 5.30 | 1.58313 | 59.4 | 81.52 |
| 11 | 48.119 | 0.00 | | | 74.00 |
| 12 | ∞ | 0.20 | | | 85.52 |
| 13 | ∞ | 50.35 | | | 85.38 |
| 14 | −826.643 | 3.50 | 2.00330 | 28.3 | 49.00 |
| 15 | −140.316 | 1.80 | 1.80400 | 46.6 | 48.46 |
| 16 | 89.625 | 0.00 | | | 45.83 |
| 17 | ∞ | 26.29 | | | 46.62 |
| 18(APERTURE STOP) | ∞ | 25.43 | | | 39.59 |
| 19 | 108.384 | 1.30 | 2.00330 | 28.3 | 32.45 |
| 20 | 29.737 | 9.10 | 1.67300 | 38.2 | 31.17 |
| 21 | −80.726 | 1.50 | | | 30.82 |
| 22 | −109.512 | 8.00 | 1.67003 | 47.2 | 29.92 |
| 23 | −40.022 | 1.30 | 1.49700 | 81.5 | 28.92 |
| 24 | 101.986 | 9.10 | | | 27.58 |
| 25 | −47.442 | 1.30 | 1.88300 | 40.8 | 27.63 |
| 26 | 125.861 | 2.00 | | | 29.11 |
| 27 | ∞ | 0.00 | | | 30.24 |
| 28 | −1323.051 | 7.07 | 1.65412 | 39.7 | 30.16 |
| 29 | −25.336 | 1.40 | 1.81600 | 46.6 | 31.17 |
| 30 | −63.505 | 3.55 | | | 34.01 |
| 31 | 390.076 | 9.44 | 1.57135 | 53.0 | 38.52 |
| 32 | −34.498 | 5.76 | 1.52249 | 59.8 | 39.60 |
| 33 | −44.253 | 3.00 | | | 42.05 |

-continued

| UNIT mm | | | | | |
|---|---|---|---|---|---|
| 34 | ∞ | 2.00 | 1.51633 | 64.2 | 42.15 |
| 35 | ∞ | 123.32 | | | 42.17 |
| IMAGE SURFACE | ∞ | | | | |

ASPHERIC SURFACE DATA

SIXTH SURFACE (DIFFRACTIVE SURFACE)

A2 = −3.03387e−005  A4 = 9.80399e−010

VARIOUS DATA

| | |
|---|---|
| FOCAL LENGTH | 584.94 |
| F-NUMBER | 4.12 |
| ANGLE OF VIEW | 2.12 |
| IMAGE HEIGHT | 21.64 |
| ENTIRE LENS LENGTH | 404.06 |
| BF | 123.32 |
| ENTRANCE PUPIL POSITION | 707.64 |
| EXIT PUPIL POSITION | −157.92 |
| FRONT PRINCIPAL POINT POSITION | 76.00 |
| REAR PRINCIPAL POINT POSITION | −461.62 |

SINGLE LENS DATA

| LENS | START SURFACE | FOCAL LENGTH |
|---|---|---|
| 1 | 1 | 250.50 |
| 2 | 3 | 279.18 |
| 3 | 5 | 1366.27 |
| 4 | 6 | −143.87 |
| 5 | 8 | 219.62 |
| 6 | 10 | −544.41 |
| 7 | 14 | 168.02 |
| 8 | 15 | −67.79 |
| 9 | 19 | −41.19 |
| 10 | 20 | 33.40 |
| 11 | 22 | 89.98 |
| 12 | 23 | −57.66 |
| 13 | 25 | −38.88 |
| 14 | 28 | 39.40 |
| 15 | 29 | −52.52 |
| 16 | 31 | 55.93 |
| 17 | 32 | −375.60 |
| 18 | 34 | 0.00 |

TABLE 1

| | Numerical Example 1 (Embodiment 1) | Numerical Example 2 (Embodiment 2) | Numerical Example 3 (Embodiment 3) | Numerical Example 4 (Embodiment 4) |
|---|---|---|---|---|
| (1) | 1.810 | 1.821 | 1.772 | 1.854 |
| (2) | 41.0 | 42.7 | 50.0 | 40.4 |
| (3) | 1.487 | 1.487 | 1.487 | 1.434 |
| (4) | 70.2 | 70.2 | 70.2 | 95.1 |
| (5) | 0.000 | 0.033 | 0.052 | 0.025 |
| (6) | 0.041 | 0.008 | 0.014 | 0.219 |
| (7) | 0.017 | 0.015 | 0.026 | 0.035 |
| (8) | 528 | 600 | 560 | 614 |
| (9) | 0.114 | 0.121 | 0.104 | 0.134 |
| (10) | 1.696 | 1.700 | 1.668 | 1.720 |
| (11) | 14.5 | 14.2 | 17.2 | 12.9 |
| (12) | 5.178 | 4.884 | 5.710 | 4.402 |

[Embodiment 5]

Figure 17:
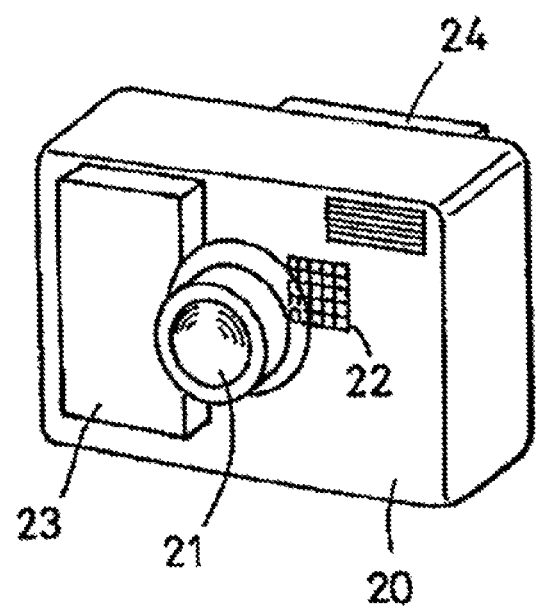
FIG. 17 is a perspective view of a digital camera that is Embodiment 5 of the present invention.

FIG. 17 shows a digital still camera (image pickup apparatus) using the lens of any one of the above-described Embodiments 1 to 4 as an image taking optical system.

In FIG. 17, reference numeral 20 denotes a camera body, reference numeral 21 denotes an image taking optical system, and reference numeral 22 denotes a solid-state image pickup element (photoelectric conversion element), such as a CCD sensor or a CMOS sensor, which receives an object image formed by the image taking optical system 21.

Reference numeral 23 denotes a memory that records image data obtained by photoelectric conversion of the object image by the image pickup element 22. Reference numeral 24 denotes a viewfinder to observe the image data through a liquid crystal display panel or the like.

Thus, applying the lens of each embodiment to the image pickup apparatus can realize an image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-220815, filed on Sep. 30, 2010, which is hereby incorporated by reference herein in its entirety.

What is claimed is:

1. An optical system comprising:
plural lens groups;
a negative lens included in a specific lens group among the plural lens groups and formed of a first medium;
a diffractive grating formed on at least one lens surface of the negative lens of the same first medium, said diffractive grating being in contact with a second medium different from the first medium; and
a positive lens included in the specific lens group and formed of a third medium different from the first medium and the second medium,
wherein the first medium satisfies the following conditions:

$ndA \geq 1.7$ $40 \geq vdA55$ where ndA represents a refractive index of the first medium for a d-line, and vdA represents an Abbe number of the first medium for the d-line, and
wherein the third medium satisfies the following conditions:

$ndC \leq 1.55$ $vdC \geq 60$ where ndC represents a refractive index of the third medium for the d-line, and vdC represents an Abbe number of the third medium for the d-line.

2. An optical system according to claim 1, wherein the following condition is further satisfied:

$0.001 < |\sqrt{(fw \times ft)}/fdoe| < 0.10$ where fdoe represents a diffractive focal length of the diffractive grating, fw represents a focal length of the optical system at a wide-angle end when an object distance is an infinity far distance, and ft is a focal length of the optical system at a telephoto end when the object distance is the infinity far distance, ft being equal to fw when the optical system has a single focal length.

3. An optical system according to claim 1, wherein the first medium is a low-melting-point glass whose glass transition temperature TgA satisfies the following condition:

$TgA \leq 650° C.$

4. An optical system according to claim 1, wherein the second medium is an ultraviolet curable resin or a fine particle dispersed material.

5. An optical apparatus comprising:
an image pickup element; and
an optical system,
wherein the optical system includes: plural lens groups;
a negative lens included in a specific lens group among the plural lens groups and formed of a first medium;
a diffractive grating formed on at least one lens surface of the negative lens of the same first medium, said diffractive grating being in contact with a second medium different from the first medium; and
a positive lens included in the specific lens group and formed of a third medium different from the first medium and the second medium,
wherein the first medium satisfies the following conditions:

$ndA \geq 1.7$ $40 \leq vdA \leq 55$ where ndA represents a refractive index of the first medium for a d-line, and vdA represents an Abbe number of the first medium for the d-line, and
wherein the third medium satisfies the following conditions:

$ndC \leq 1.55$ $vdC \geq 60$ where ndC represents a refractive index of the third medium for the d-line, and vdC represents an Abbe number of the third medium for the d-line.

6. An optical apparatus according to claim 5, wherein the following condition is further satisfied:

$0.001 < |\sqrt{(fw \times ft)}/fdoe| < 0.10$ where fdoe represents a diffractive focal length of the diffractive grating, fw represents a focal length of the optical system at a wide-angle end when an object distance is an infinity far distance, and ft is a focal length of the optical system at a telephoto end when the object distance is the infinity far distance, ft being equal to fw when the optical system has a single focal length.

7. An optical apparatus according to claim 5, wherein the first medium is a low-melting-point glass whose glass transition temperature TgA satisfies the following condition:

$TgA \leq 650 ° C.$

8. An optical apparatus system according to claim 5, wherein the second medium is an ultraviolet curable resin or a fine particle dispersed material.

9. An optical system comprising:
a negative lens including a first medium and being brought into contact and joined with a second medium different from the first medium; and
a positive lens formed of a third medium different from the first medium and the second medium,
wherein a cemented surface between the first medium and the second medium is a diffractive surface,
wherein the first medium satisfies the following conditions:

$ndA \geq 1.7$ $40 \leq vdA \leq 55$ where ndA represents a refractive index of the first medium for a d-line, and vdA represents an Abbe number of the first medium for the d-line, and
wherein the third medium satisfies the following conditions:

$ndC \leq 1.55$ $vdC \geq 60$ where ndC represents a refractive index of the third medium for the d-line, and vdC represents an Abbe number of the third medium for the d-line.

10. An optical system according to claim 9, wherein the following condition is further satisfied:

$$0.00 \leq |LGAC/\sqrt{(OLW \times OLT)}| < 0.10$$

where LGAC represents a distance on an optical axis between the diffractive surface and a lens surface of the positive lens facing toward the negative lens, OLW represents an entire optical length of the optical system when a focal length is at a wide-angle end when an object distance is an infinitely far distance, and OLT represents an entire optical length of the optical system when a focal length is at a telephoto end and the object distance is the infinitely far distance, OLT being equal to OLW when the optical system has a single focal length.

11. An optical system according to claim 9,
wherein the optical system includes a first lens that is a lens disposed closest to an object, a second lens that is a lens disposed closest to an image, and an aperture stop, and wherein the following condition is further satisfied:

$$0.001 < |LOID/\sqrt{(OLW \times OLT)}| < 0.50$$

where LOID represents (a) a distance from an object side lens surface of the first lens to the diffractive surface when the diffractive surface is disposed closer to the object than the aperture stop and an object distance is an infinitely far distance or (b) a distance from an image side lens surface of the second lens to the diffractive surface when the diffractive surface is disposed closer to the image than the aperture stop and the object distance is the infinitely far distance, OLW represents an entire optical length of the optical system when a focal length is at a wide-angle end when an object distance is an infinitely far distance, and OLT represents an entire optical length of the optical system when a focal length is at a telephoto end and the object distance is the infinitely far distance, OLT being equal to OLW when the optical system has a single focal length.

12. An optical system according to claim 9, wherein the following condition is further satisfied:

$$0.001 < |\sqrt{(fw \times ft)}/fdoe| < 0.10$$

where fdoe represents a diffractive focal length of the diffractive surface, fw represents a focal length of the optical system at a wide-angle end when an object distance is an infinity far distance, and ft is a focal length of the optical system at a telephoto end when the object distance is the infinity far distance, ft being equal to fw when the optical system has a single focal length.

13. An optical system according to claim 9, wherein the first medium is a low-melting-point glass whose glass transition temperature TgA satisfies the following condition:

$$TgA \leq 650\ °C.$$

14. An optical system according to claim 9, wherein the diffractive surface is diffractive grating, and
wherein the second medium satisfies the following conditions:

$$ndA - ndB > 0$$

$$ndB \geq 1.60$$

$$vdB \leq 25$$

$$hd \leq 8\ \mu m$$

where ndB represents a refractive index of the second medium for the d-line, vdB represents an Abbe number of the second medium for the d-line, and hd represents a grating thickness of the diffractive grating.

15. An optical system according to claim 14, wherein the second medium is an ultraviolet curable resin or a fine particle dispersed material.

16. An optical system according to claim 9,
wherein the optical system has a plurality of lens groups, and
wherein the negative lens and the positive lens are included in the same lens group of the plurality of lens groups.

17. An optical system according to claim 9, wherein the same lens group has a positive refractive power.

18. An optical apparatus comprising:
an image pickup element; and
an optical system,
wherein the optical system includes:
a negative lens including a first medium and being brought into contact and joined with a second medium different from the first medium; and
a positive lens formed of a third medium different from the first medium and the second medium,
wherein a cemented surface between the first medium and the second medium is a diffractive surface,
wherein the first medium satisfies the following conditions:

$$ndA \geq 1.7$$

$$40 \leq vdA \leq 55$$

where ndA represents a refractive index of the first medium for a d-line, and vdA represents an Abbe number of the first medium for the d-line, and
wherein the third medium satisfies the following conditions:

$$ndC \leq 1.55$$

$$vdC \geq 60$$

where ndC represents a refractive index of the third medium for the d-line, and vdC represents an Abbe number of the third medium for the d-line.

19. An optical apparatus according to claim 18,
wherein the optical system has a plurality of lens groups, and
wherein the negative lens and the positive lens are included in the same lens group of the plurality of lens groups.

20. An optical apparatus according to claim 18, wherein the same lens group has a positive refractive power.

* * * * *